US009540859B2

(12) United States Patent
Hansen

(10) Patent No.: US 9,540,859 B2
(45) Date of Patent: Jan. 10, 2017

(54) POWER CLOSURE SYSTEM

(71) Applicant: Strattec Power Access LLC, Auburn Hills, MI (US)

(72) Inventor: Eric R. Hansen, Lake Orion, MI (US)

(73) Assignee: STRATTEC POWER ACCESS LLC, Auburn Hills, MI (US)

( * ) Notice: Subject to any disclaimer, the term of this patent is extended or adjusted under 35 U.S.C. 154(b) by 0 days.

(21) Appl. No.: 14/741,276

(22) Filed: Jun. 16, 2015

(65) Prior Publication Data

US 2015/0361710 A1 Dec. 17, 2015

Related U.S. Application Data

(60) Provisional application No. 62/012,881, filed on Jun. 16, 2014, provisional application No. 62/089,915, filed on Dec. 10, 2014, provisional application No. 62/121,270, filed on Feb. 26, 2015.

(51) Int. Cl.

| | |
|---|---|
| ***B62D 33/027*** | (2006.01) |
| ***B62D 33/03*** | (2006.01) |
| ***E05F 15/614*** | (2015.01) |
| *E05F 1/10* | (2006.01) |
| *E05F 3/14* | (2006.01) |

(52) U.S. Cl.

CPC ............ *E05F 15/614* (2015.01); *E05F 1/1033* (2013.01); *E05F 3/14* (2013.01); *E05Y 2201/216* (2013.01); *E05Y 2600/626* (2013.01); *E05Y 2800/232* (2013.01); *E05Y 2900/516* (2013.01); *E05Y 2900/546* (2013.01)

(58) Field of Classification Search

CPC .... B62D 33/03; B62D 33/0273; E05F 15/614; E05F 3/14; E05F 1/033; E05Y 2201/434; E05Y 2800/232; E05Y 2900/516; E05Y 2900/546; E05Y 2201/216; E05Y 26/626

See application file for complete search history.

(56) References Cited

U.S. PATENT DOCUMENTS

| | | | | |
|---|---|---|---|---|
| 2003/0089041 A1* | 5/2003 | Daniels | E05F 15/619 49/341 |
| 2008/0277960 A1* | 11/2008 | Zagoroff | B62D 33/03 296/57.1 |

FOREIGN PATENT DOCUMENTS

| | | |
|---|---|---|
| WO | 03036008 | 5/2003 |

* cited by examiner

*Primary Examiner* — Glenn Dayoan
*Assistant Examiner* — Melissa A Black
(74) *Attorney, Agent, or Firm* — Michael Best & Friedrich LLP

(57) ABSTRACT

The tailgate drive includes a motor assembly in operable communication with a pickup tailgate that is adjustable between a manual mode of operation and an automatic mode of operation, where the motor assembly permits free rotation of the tailgate between the open and closed positions during manual mode of operation and wherein the motor assembly drives the tailgate body between the open and closed position during the automatic mode of operation.

16 Claims, 30 Drawing Sheets

POWER CLOSURE SYSTEM

CROSS-REFERENCE TO RELATED APPLICATIONS

This application claims priority to U.S. Provisional Patent Application Nos. 62/012,881 filed on Jun. 16, 2014; 62/089,915 filed on Dec. 10, 2014; and 62/121,270 filed on Feb. 26, 2015. The entire contents of each application is hereby incorporated by reference.

FIELD OF THE INVENTION

Exemplary embodiments of the present invention are generally related to closure manipulating systems. More particularly, in some exemplary embodiments, the present invention provides a power closure system for use on a tailgate.

BACKGROUND

During use, an owner of a pickup truck is required to repeatedly open and close the tailgate of his or her pickup truck to provide selective access to the cargo area of the truck. In particular instances, the user may be required to remove the tailgate from the truck so as to provide the necessary accommodations for larger loads. In modern truck designs, compromises must be struck to permit the installation of ever-greater number and types of features in the truck while still maintaining the ease of use the earlier designs contained.

SUMMARY

In one embodiment, the present invention provides a tailgate drive for use with a tailgate in a cargo bed of a pickup truck, the cargo bed having a first hinge bracket and a second hinge bracket, and the tailgate defining a volume therein. The tailgate drive includes a counterbalance assembly positioned within the volume of the tailgate and removably coupled to one of the first hinge bracket and the second hinge bracket, and a motor assembly positioned within the volume of the tailgate and removably coupled to one of the first hinge bracket and the second hinge bracket, the motor assembly operable to rotate the tailgate with respect to the cargo bed between an opened position and a closed position.

In another embodiment, the present invention provides a tailgate drive for use with a tailgate positioned in a cargo bed of a motor vehicle, the cargo bed having a first hinge bracket and a second hinge bracket coupled thereto, and the tailgate is rotatable about an axis with respect to the cargo bed between an open position and a closed position, where the axis is at least partially defined by the first hinge bracket and the second hinge bracket, and the tailgate defines a volume therein. The tailgate drive includes a motor assembly positioned within the volume of the tailgate and operatively coupled to one of the first hinge bracket and the second hinge bracket, the motor assembly operable to rotate the tailgate about the axis between the opened position and the closed position.

In another embodiment, the present invention provides a tailgate drive for use with a tailgate positioned in a cargo bed of a motor vehicle, the cargo bed having a first hinge bracket and a second hinge bracket coupled thereto, the tailgate defining a volume therein and being rotatable with respect to the cargo bed between an opened position and a closed position. The tailgate drive includes a motor assembly in operable communication with the tailgate and adjustable between a manual mode of operation and an automatic mode of operation, where the motor assembly permits free rotation of the tailgate between the open and closed positions during manual mode of operation and wherein the motor assembly drives the tailgate body between the open and closed position during the automatic mode of operation.

BRIEF DESCRIPTION OF THE DRAWINGS

Other objects, features, advantages and details appear, by way of example only, in the following detailed description of embodiments, the detailed description referring to the drawings in which.

DETAILED DESCRIPTION

Figure 1:
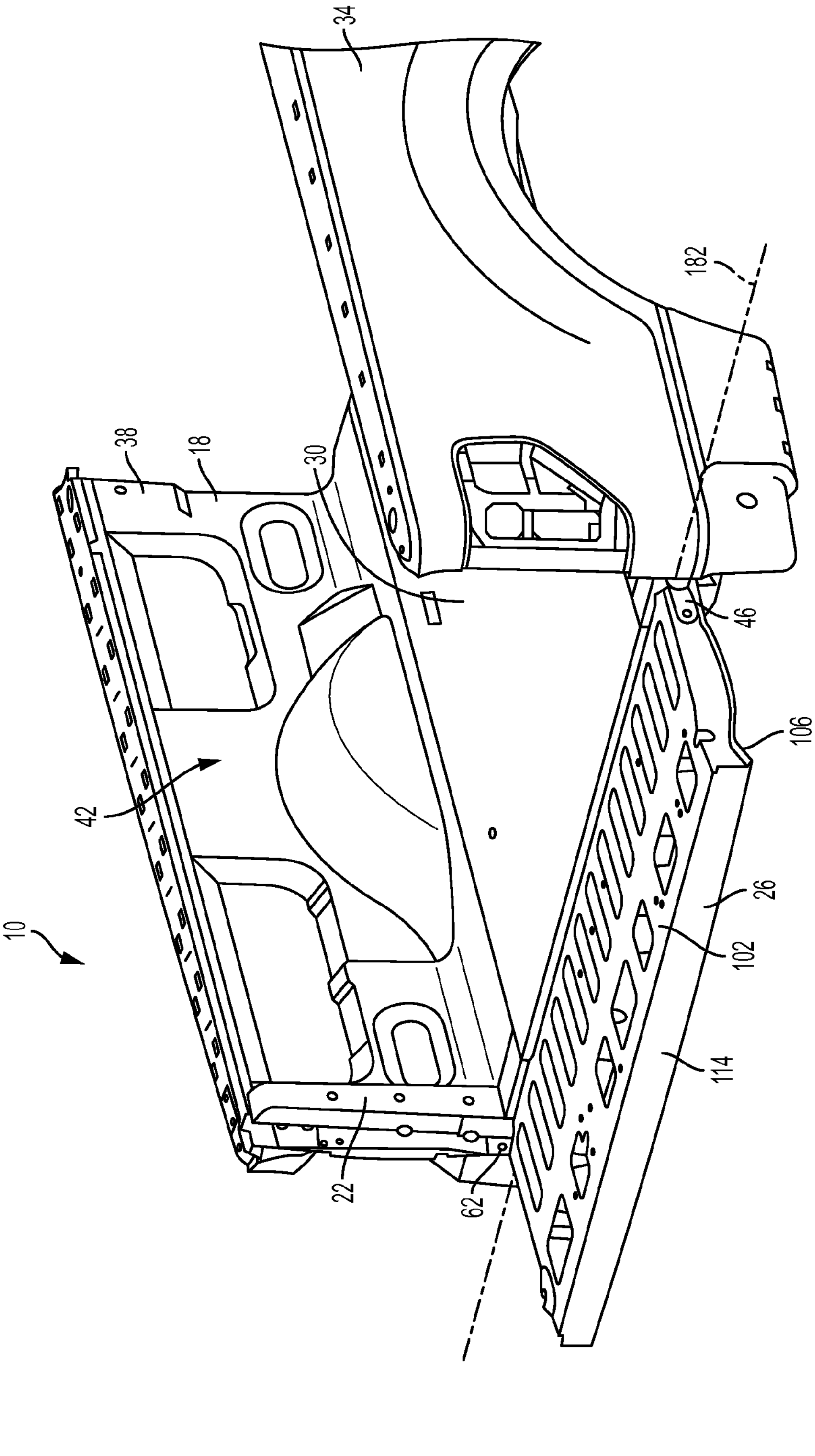
FIG. 1 is a perspective view of a vehicle cargo bed with a tailgate in an opened position in accordance with one embodiment.
Figure 2:
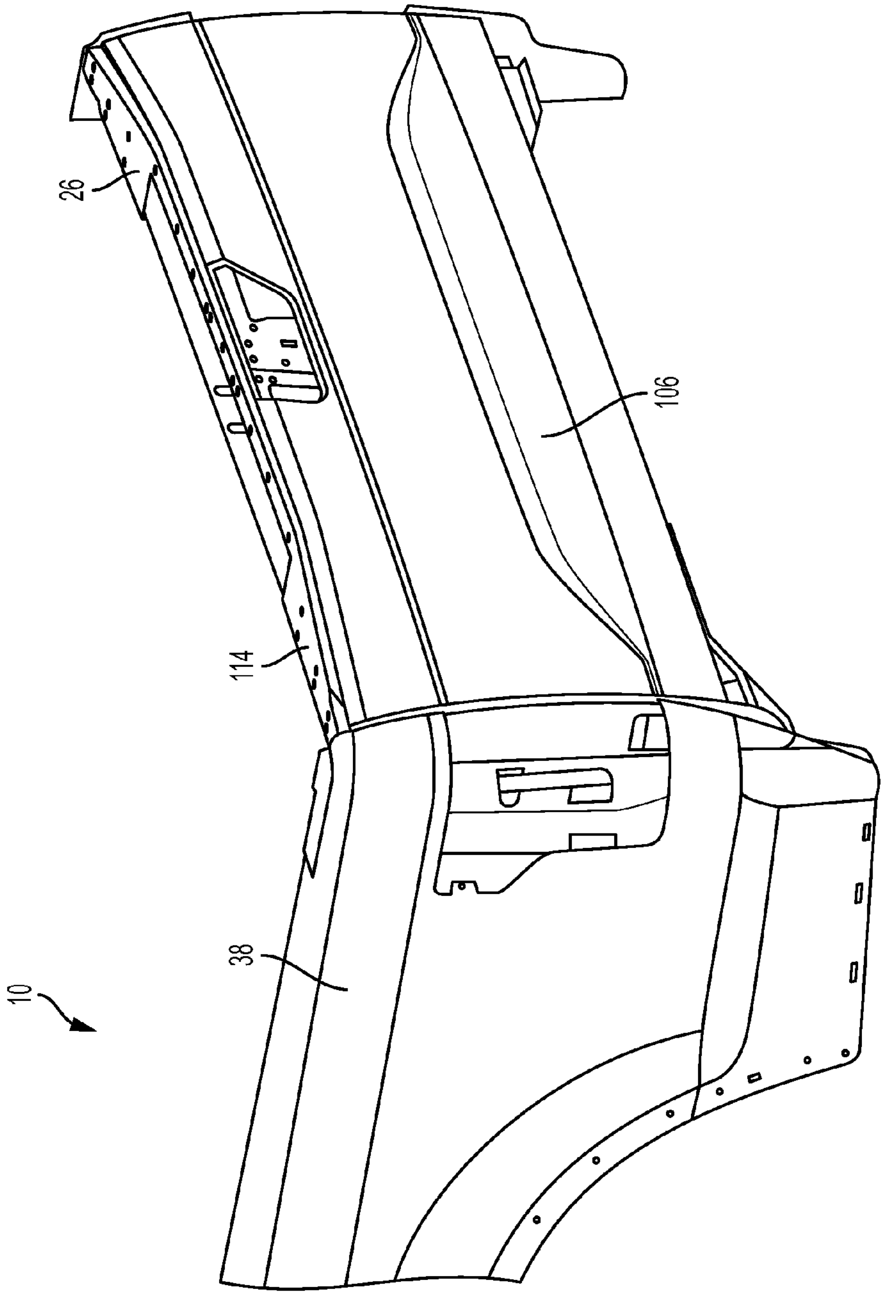
FIG. 2 is a perspective view illustrating the vehicle cargo bed of FIG. 1 with the tailgate in a closed position.

FIGS. 1-2 illustrate a pickup truck cargo bed 10 including a powered closure system 14 of the present invention. The cargo bed 10 includes a body 18 defining a closure frame 22, and a tailgate or closure 26 pivotably and removably coupled to the body 18 and rotatable with respect to the closure frame 22 between an opened position (FIG. 1), and a closed position (FIG. 2). In the illustrated embodiment, the body 18 of the cargo bed 10 includes a floor panel 30, a first side wall 34 extending upwardly from an edge of the floor panel 30, and a second side wall 38 extending upwardly from an edge of the floor panel 30 opposite the first side wall 34. Together, the first side wall 34, the second side wall 38, and the floor panel 30 at least partially define a cargo storage area 42 in which items may be placed and stored for transport. In the illustrated embodiment, the closure frame 22 is defined by the rear edges of the floor panel 30, the first side wall 34, and the second side wall 38.

Illustrated in FIGS. 1-9, the cargo bed 10 also includes a first hinge bracket 46 coupled to the first side wall 34 and positioned proximate the closure frame 22. The first hinge bracket 46 includes a mounting plate 50 secured to the first side wall 34 by one or more fasteners 55, and a hinge lug 58 fixedly coupled to the mounting plate 50. In the illustrated embodiment, the hinge lug 58 has a substantially elongated, non-circular cross-section.

The cargo bed 10 also includes a second hinge bracket 62 coupled to the second side wall 38, opposite the first hinge bracket 46, and positioned proximate the closure frame 22. The second hinge bracket 62 includes a mounting plate 66 secured to the second side wall 38 by one or more fasteners 55, and a hinge cup 70 (FIG. 9) extending outwardly from the mounting plate 66 to create an open end 74. In the illustrated embodiment, the hinge cup 70 is substantially cylindrical in shape and the open end 74 faces away from the second side wall 38. When the tailgate 26 is installed on the cargo bed 10, at least a portion of a hinge lug 178 (described below) is rotatably received within the cup 70. Together, the first hinge bracket 46 and the second hinge bracket 62 provide the two mounting locations about which the tailgate 26 pivots when rotating between the open and closed positions.

The second hinge bracket 62 of the present invention may also include a bell crank assembly 82 rotatable with respect to the second hinge bracket 62 and in operable communication with a damper (not shown) for example a spring, a gas strut, a fluid strut, a reverse driver, and the like. In the illustrated embodiment, the bell crank assembly 82 includes a rotatable shaft 86 passing perpendicularly through the second hinge bracket 62, and a crank arm 90 extending radially from a distal end 94 of the shaft 86. In the illustrated embodiment, the damper is coupled to a distal end 98 of the crank arm 90 (see FIG. 9).

When the tailgate 26 is installed in the cargo bed 10, the shaft 86 of the bell crank assembly 82 is configured to engage and rotate with the tailgate 26 such that the shaft 86 and crank arm 90 transmit the rotation of the tailgate 22 to the damper. As such, the damper limits the rotational speed of the tailgate 26 with respect to the closure frame 22 by providing dampening forces in response to tailgate 26 movements.

Illustrated in FIGS. 1-4, the tailgate 26 of the cargo bed 10 is substantially rectangular in shape having a tailgate body formed of a front wall 102, a rear wall 106 spaced a distance from the front wall 102, and a plurality of side walls, each side wall extending between the perimeters of the front and rear walls 102, 106 to define a volume 110 therebetween. More specifically, the side walls include a top wall 114 extending between the top of the front wall 102 and the top of the rear wall 106, a bottom wall 118 opposite the top wall 114, a right wall 122 extending between the right side of the front wall 102 and the right side of the rear wall 106, and a left wall 126 opposite the right wall 122.

Figure 3:
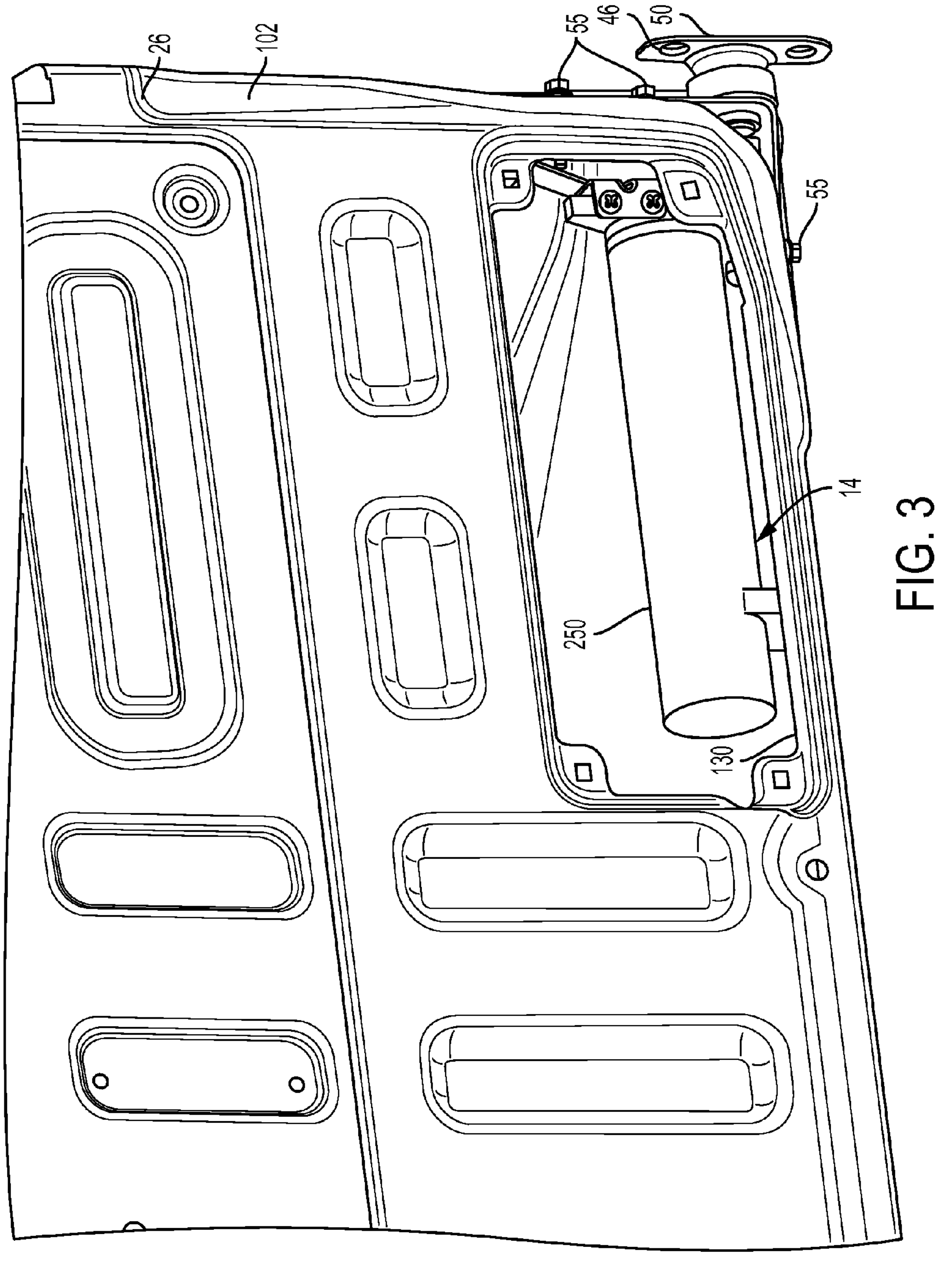
FIG. 3 is a detailed front view of the tailgate of FIG. 1 with an access panel removed.
Figure 4:
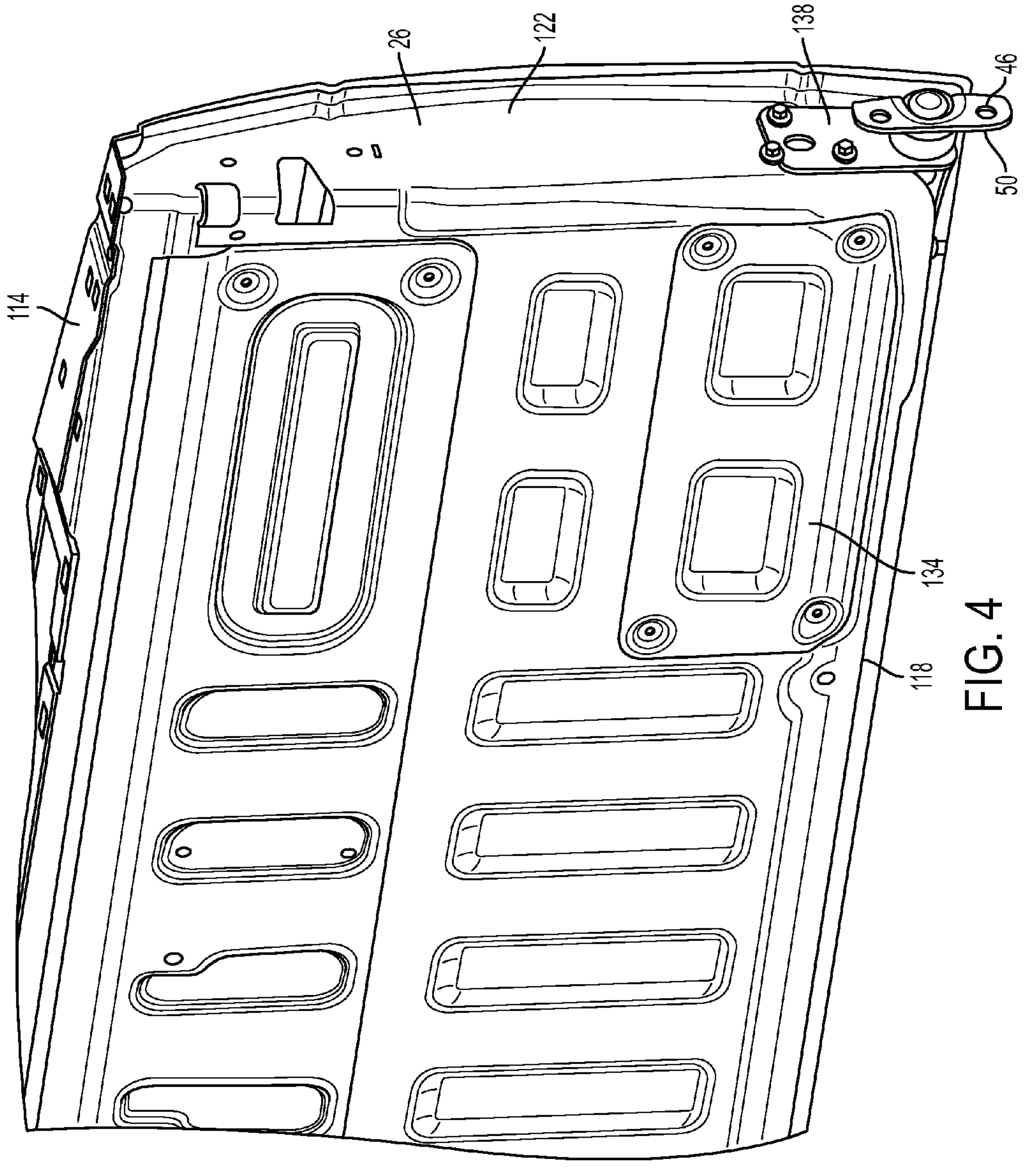
FIG. 4 is a detailed front view of the tailgate of FIG. 3 with the access panel installed.

Illustrated in FIGS. 3 and 4, the front wall 102 of the tailgate 26 defines an aperture 130 providing selective access to the volume 110 of the tailgate 26 and allowing the user to install, remove, or service the closure system 14—or other elements—contained therein. In the illustrated embodiment, the aperture 130 is secured by an access panel 134 removably coupled to the tailgate 26 and restricting access to the volume 110 through the aperture 130. The access panel 134 also limits the amount of dirt and debris that can enter the volume and potentially damage the powered closure access system 14.

The tailgate 26 also includes a first corner bracket 138 coupled to the tailgate 26 proximate the lower-right corner. The first corner bracket 138 is substantially L-shaped having a first leg 142 in contact with the bottom wall 118 of the tailgate 26 and a second leg 146 in contact with the right wall 122 of the tailgate 26. In the illustrated embodiment, the first corner bracket 138 is coupled to the tailgate 26 with one or more fasteners 55. The corner bracket 138 is configured to provide additional rigidity and strength to the tailgate 26 while also providing a foundation for additional mounting elements.

The first corner bracket 138 also includes a hinge member 150 coupled to the second leg 146 of the first corner bracket 138 and extending outwardly therefrom. The hinge member 150 is substantially annular in shape having a first open end 154 sized to receive at least a portion of a coupler 158 therein (described below), and a second open end 162 extending opposite the first open end 154. In the illustrated embodiment, the first open end 154 forms an inner diameter that is larger than the inner diameter of the second open end 162. When the tailgate 26 is assembled, a coupler 158 is positioned within and able to rotate with respect to both the first corner bracket 138 and the hinge member 150. Although not shown, the hinge member 150 also defines an aperture formed in the wall of the first open end 154 to permit the introduction and removal of the hinge lug 58 into the coupler 158.

The tailgate 26 also includes a second corner bracket 166 positioned proximate the lower, left-hand corner of the tailgate 26 opposite the first corner bracket 138. Similar to the first corner bracket 138, the second corner bracket 166 is substantially L-shaped having a first leg 170 in contact with the bottom wall 118 of the tailgate 26 and a second leg 174 in contact with a left-side wall 126 of the tailgate 26.

The second corner bracket 166 also includes a substantially cylindrical hinge lug 178 extending outwardly from the second leg 174 of the bracket. When the tailgate 26 is installed in the cargo bed 10, the hinge lug 178 is at least partially received within the hinge cup 70 of the second hinge bracket 62 (described above).

Together, the hinge member 150 of the first corner bracket 138 and the hinge lug 178 of the second corner bracket 166 define an axis of rotation 182 extending substantially lengthwise along the tailgate 26 proximate the bottom wall 118. During use, the tailgate 26 pivots about this axis 182 between the open and closed positions.

The tailgate 26 also includes a latch mechanism (not shown) to secure the tailgate 26 in the closed position. During use, the latch mechanism may be released both manually, via the use of a handle (not shown), or automatically, by receiving a signal from a control unit (described below).

The tailgate 26 also includes a torque bar system 190 configured to act as a counterbalance for the weight of the tailgate 26 as it moves between the open and closed positions. The torque bar system 190 includes a torque bar 194 having a first end 198 and a second end 202 opposite the first end 198, a coupler 158 fixedly coupled to the first end 198 of the torque bar 194, and an anchor block 206 fixedly coupled to the second end 202 of the torque bar 194. During use, the rotational motion of the tailgate 26 with respect to the closure frame 22 is transmitted to the torque bar 194 which, through torsion, creates torque acting about the axis of rotation 182 opposite the moment created about the axis 182 by the weight of the tailgate 26. As such, the two forces at least partially cancel each other out, reducing the amount of force that is required to rotate the tailgate 26 between the opened position and the closed position.

The torque bar 194 of the torque bar system 190 includes a substantially elongated metallic bar having a first end 198 and a second end 202 opposite the first end 198. During use, the torque bar 194 produces torque by way of torsion when the first end 198 of the bar is rotated with respect to the second end 202 of the bar. For example, as the first end 198 of the torque bar 194 is rotated in a clockwise direction with respect to the second end 202, the bar 194 produces a torque in the counter-clockwise direction resisting the twisting motion. The further the first end 198 of the torque bar 194 is rotated with respect to the second end 202, the greater the magnitude of the torque produced. In the illustrated embodiment, both the first end 198 and the second end 202 of the torque bar 194 include a key surface 210. When assembled, the keyed surfaces 210 are configured to engage with and rotationally lock the first end 198 and the second end 202 of the torque bar 194 with the coupler 158 and anchor block 206, respectively. While the illustrated construction includes a flattened surface on an otherwise cylindrical bar, additional shapes of key surfaces may be used such as splines, keyways, locking pins, and the like.

The coupler 158 of the torque bar system 190 is configured to fix the first end 198 of the torque bar 194 with respect to the cargo bed 10 via the first hinge bracket 46. The coupler 158 is substantially cylindrical in shape having a first portion 214 defining a first outer diameter and a second portion 218 extending axially from the first portion 214 to define a second outer diameter smaller than the first outer diameter. More specifically, the first outer diameter is configured to substantially correspond to the inner diameter of the first open end 154 of the hinge member 150 and the second outer diameter is configured to substantially correspond to the inner diameter of the second open end 162 of the hinge member 150. The size and shape of the coupler 158 allows the hinge member 150 to rotate with respect to the coupler 158 while providing the necessary support for the tailgate 26 within the closure frame 22 of the cargo bed 10.

Figure 7:
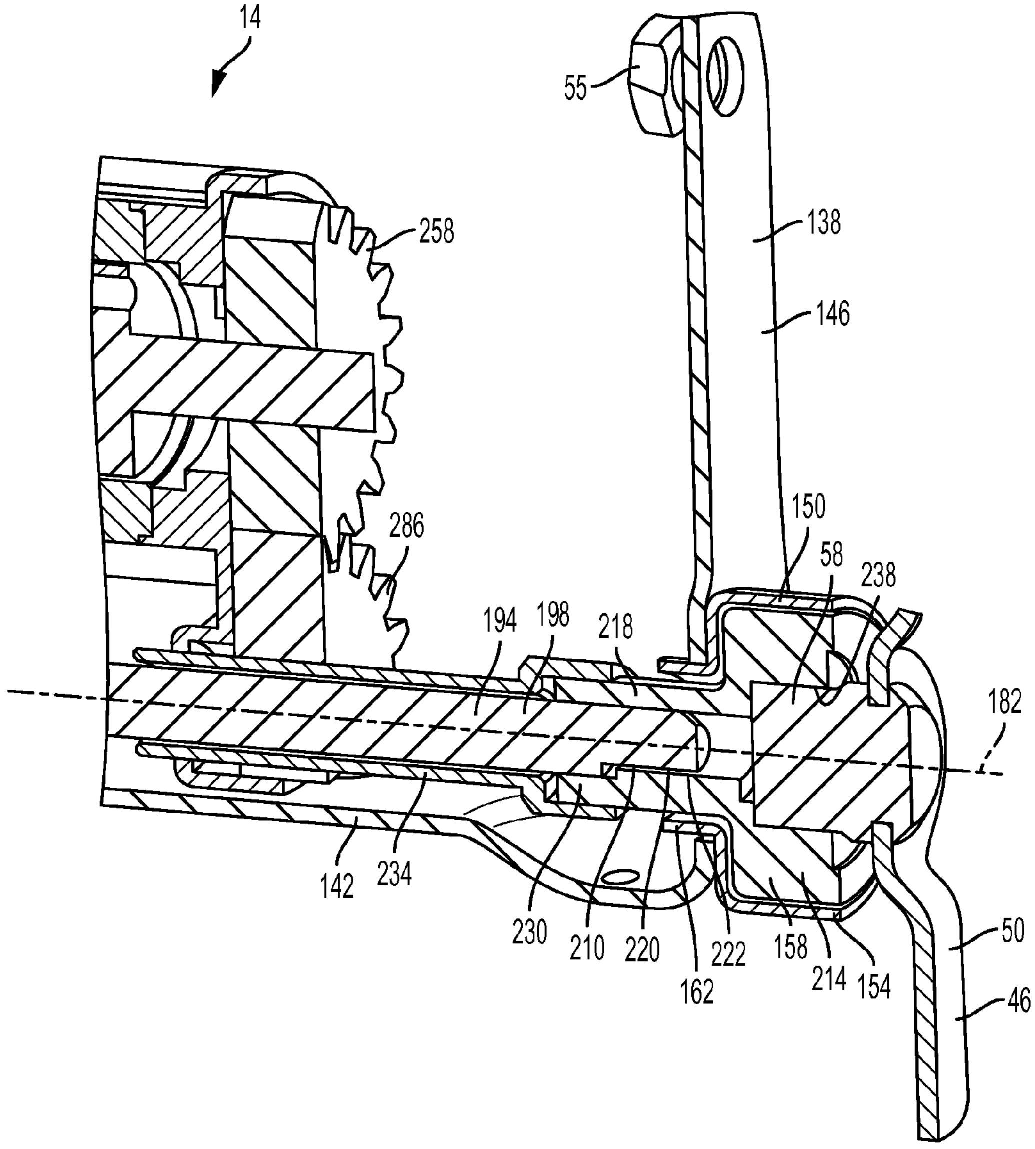
FIG. 7 is a section view of FIG. 6 taken along lines 7-7.

Best illustrated in FIG. 7, the second portion 218 of the coupler 158 defines a locking channel 220 extending axially therethrough. In the illustrated embodiment, the locking channel 220 includes a key surface 222 sized to correspond with the key surface 210 of the first end 198 of the torque bar 194. When assembled, the first end 198 of the torque bar 194 is at least partially positioned within the locking channel 220 of the coupler 158 causing the first end 198 of the torque bar 194 and the coupler 198 to rotate together as a unit.

The second portion 218 of the coupler 158 also includes a plurality of exterior splines 226 sized and shaped to be at least partially received within and mesh with the interior splines 230 of the collar 234 (described below). When assembled, the splines 230 cause the coupler 158 and the collar 234 to rotate together as a unit. Although splines are provided, alternative embodiments may utilize other ways of rotationally keying the coupler 158 and the collar 234.

Figure 6:
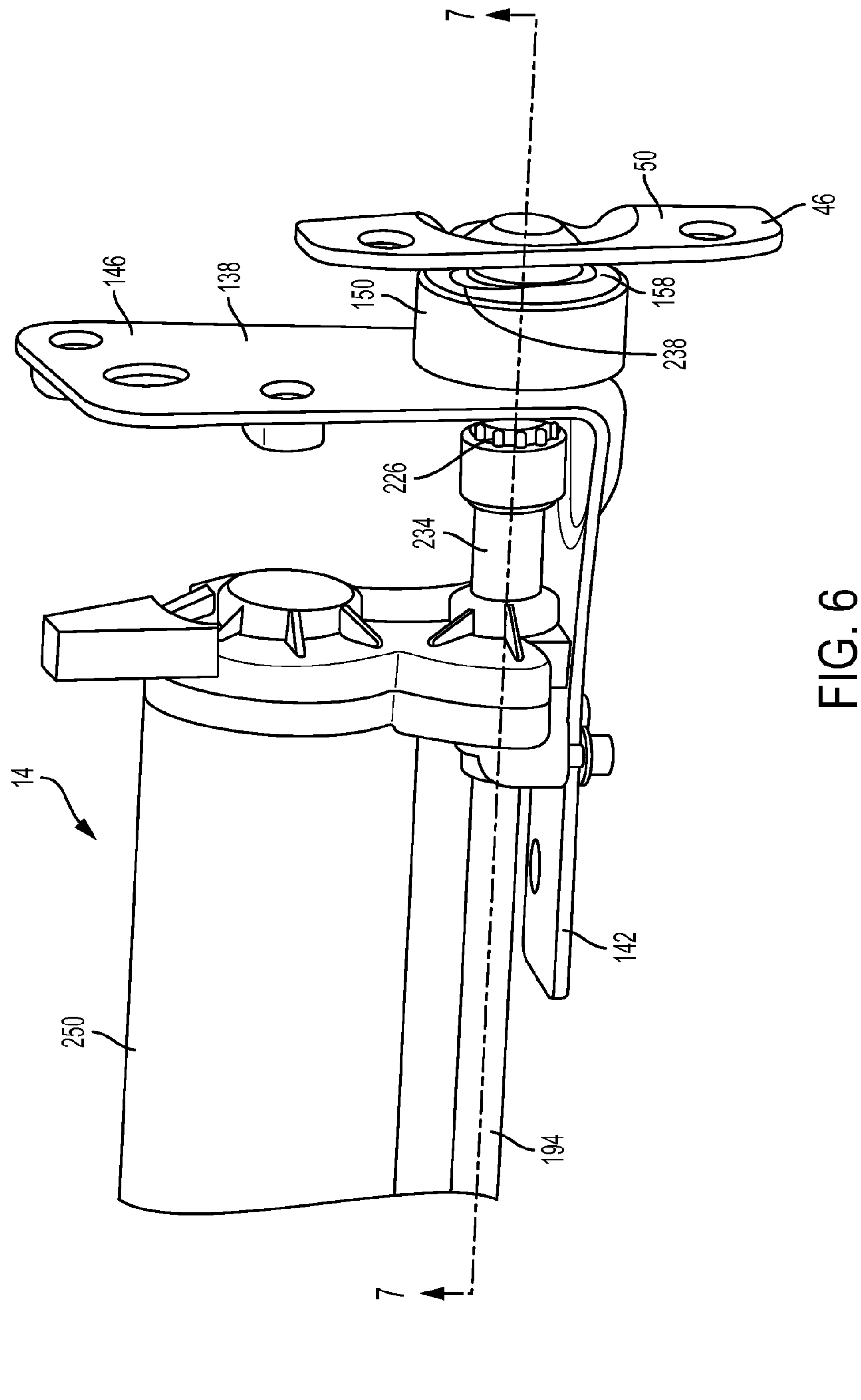
FIG. 6 is a detailed view of the power closure system of FIG. 5.

Also illustrated in FIGS. 6 and 7, the first portion 214 of the coupler 158 defines a slot 238 configured to receive at least a portion of the hinge lug 58 therein. When assembled, the elongated shape of the hinge lug 58 and corresponding elongated shape of the slot 238 permit the lug 58 to be removably positioned within the slot 238 while causing the lug 58 and coupler 158 to be rotationally fixed with respect to one another. As such, when the tailgate 26 is installed on the cargo bed 10, the first end 198 of the torque bar 194 is rotationally fixed with respect to the coupler 158, and the coupler 158 is in turn rotationally fixed with respect to the hinge lug 58. In all, when the tailgate 26 is installed on the cargo bed 10, the first end 198 of the torque bar 194, the coupler 158, and the hinge lug 58 are all rotationally fixed with respect to the cargo bed 10.

The slot 238 may also include an open end (not shown) to allow the hinge lug 58 to slide radially into and out of the slot 238. More specifically, the coupler 158 is configured such that, when no load is being placed on the torque bar 194, the open end of the slot 238 and the aperture of the hinge member 150 align allowing the hinge lug 58 to be radially introduced into and removed out of the slot 238.

Figure 5:
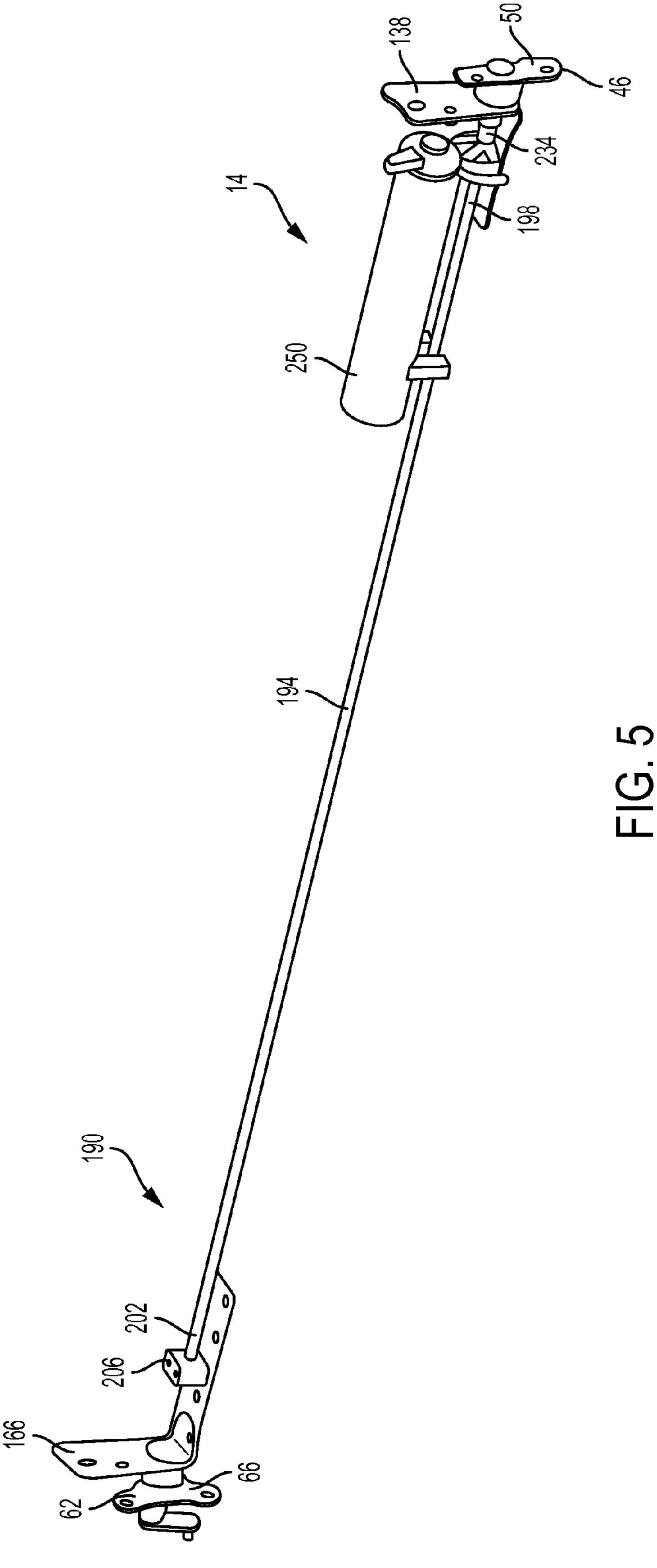
FIG. 5 is a perspective view illustrating a torque bar assembly and power closure system of the lift gate of FIG. 1.

Illustrated in FIG. 5, the anchor block 206 of the torque bar system 190 is fixedly coupled to both the second corner bracket 166 of the tailgate 26 and the second end 202 of the torque bar 194. During use, the anchor block 206 is configured to fix the second end 202 of the torque bar 194 with respect to the tailgate 26 causing the two elements to rotate together as a unit. Although the anchor block 206 is coupled to the second corner bracket 166, in alternative embodiments the anchor block 206 may be secured to any area on the tailgate 26.

To install the tailgate 26 on the cargo bed 10, the user axially introduces the hinge lug 178 of the tailgate 26 into the hinge member 70 of the second hinge bracket 62. Once the hinge lug 178 is partially received therein, the user begins to pivot the tailgate body 26 until the hinge lug 58 of the first hinge bracket 46 aligns with the aperture of the hinge member 150 and the open end 242 of the slot 238. The user then radially introduces the lug 58 into the slot 238.

Once the lug 58 is positioned within the slot 238, the user is free to rotate the tailgate 26 about the axis 182 between the open and closed positions. If present, the user may also attach support straps (not shown) to help limit the extent of rotation allowed.

To remove the tailgate 26 from the cargo bed 10, the user rotates the tailgate 26 until the open end 242 of the slot 238 aligns with the aperture of the hinge member 150. The user then manipulates the body of the tailgate 26 until the lug 58 is radially removed from the slot 238. Once the lug 58 is removed from the slot 238, the user may axially remove the hinge lug 178 from the hinge cup 70.

In particular, the tailgate 26 of the present invention may be installed and removed without tools as is typically done in the art. As such, the present invention permits the tailgate to be removed and installed as is typically done in the art—while providing powered lift assist—without any major modifications or the need for tools and the like.

Illustrated in FIGS. 5-7 and 10-11, the powered closure system 14 is configured to automatically rotate the tailgate 26 about the axis 182 between the opened position and the closed position. More specifically, the closure system 14 utilizes the components of the torque bar system 190 (i.e., the coupler 158) to transmit forces to the cargo bed 10, which in turn, cause the tailgate 26 to rotate with respect to the cargo bed 10. As such, even with the closure system 14 installed, the tailgate 26 can still utilize the torque bar system 190 and can be installed in and removed from the cargo bed 10 in an ordinary manner without the need for tools. Still further, the closure system 14 does not require the removal of the bell crank assembly 82.

The powered closure system 14 of the present invention includes a motor assembly 250, a collar 234 driven by the motor assembly 250, and an electric control module (ECM) 254 operable to control the operation of the motor assembly 250. The ECM 254 is positioned within the volume 110 of the tailgate 26 and is coupled to the vehicle's electrical system through a detachable cable junction or umbilical (not shown). During use, the motor assembly 250 drives an output pinion 258 which in turn drives the collar 234 causing the tailgate 26 to rotate about the axis 182. The powered closure system 14 of the present invention automatically rotates the tailgate 26 between the opened position and the closed position and is operable in both a manual and automatic mode.

Figure 10:
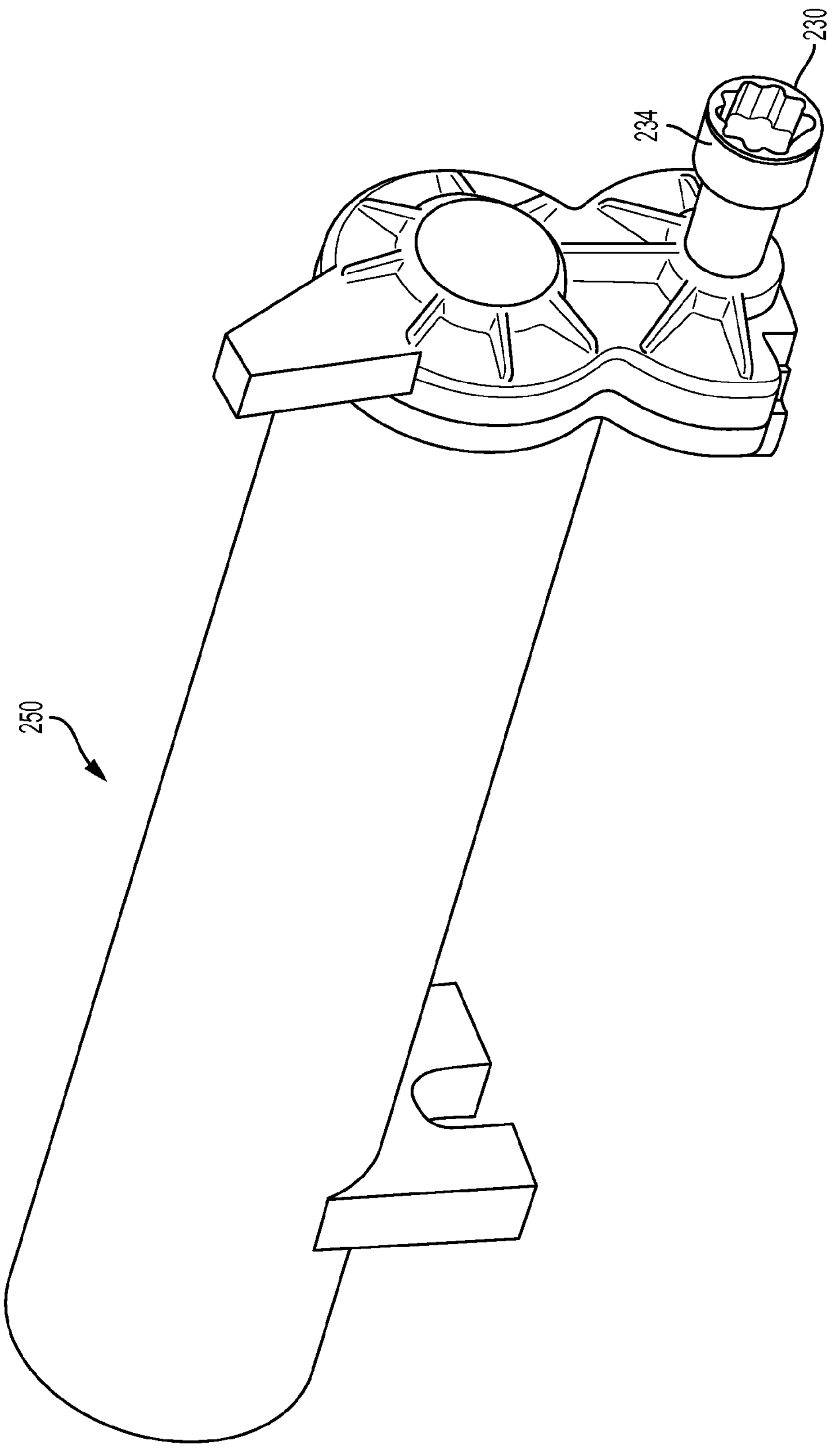
FIG. 10 is a perspective view illustrating a motor assembly of the power closure system of FIG. 5.
Figure 11:
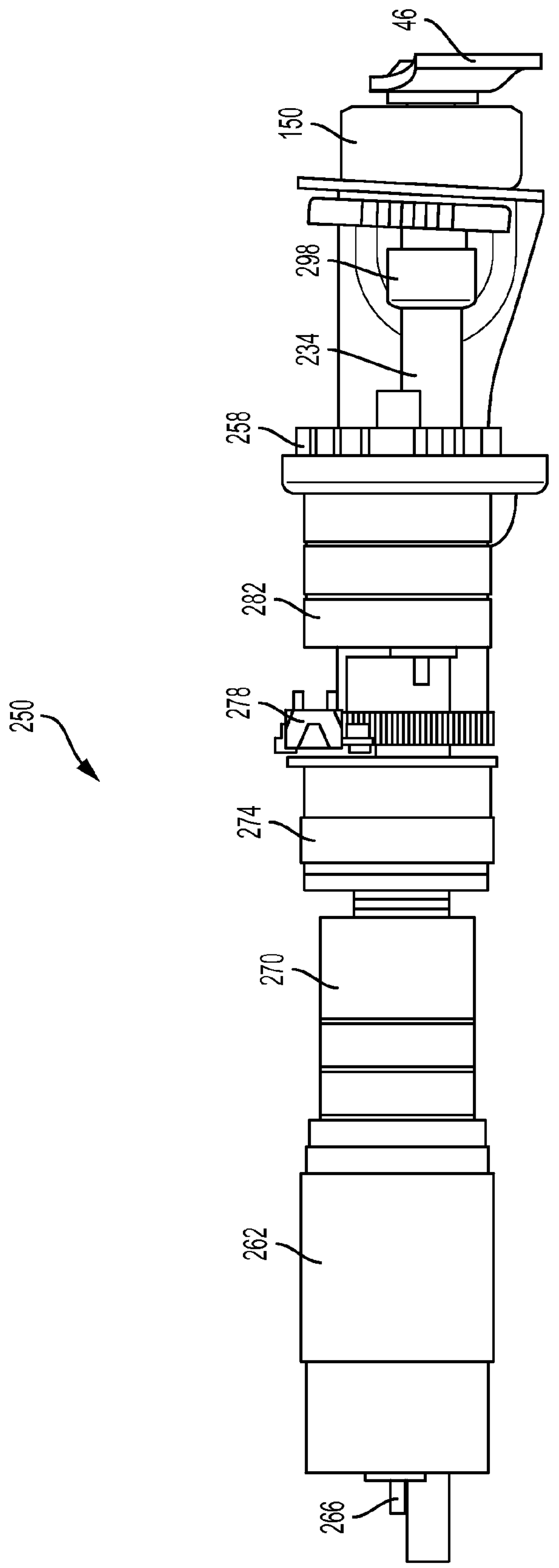
FIG. 11 is a detailed top view of the motor assembly of FIG. 10 with a cover removed.
Figure 12:
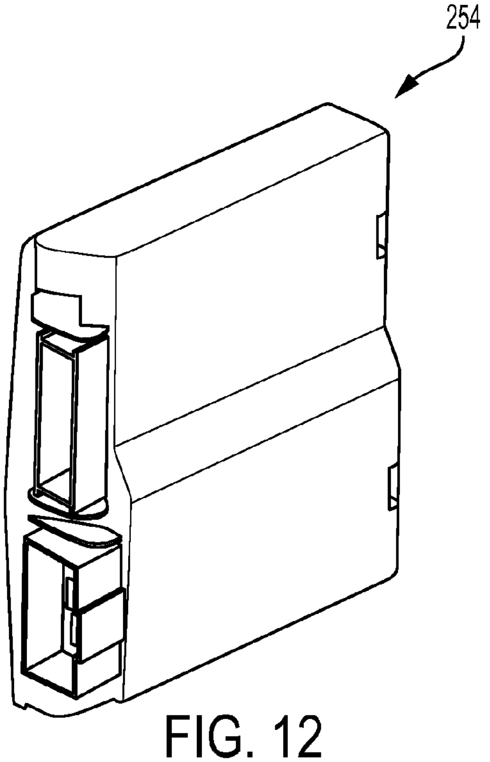
FIG. 12 illustrates an electronic control module of the power closure system of FIG. 5.
Figure 13:
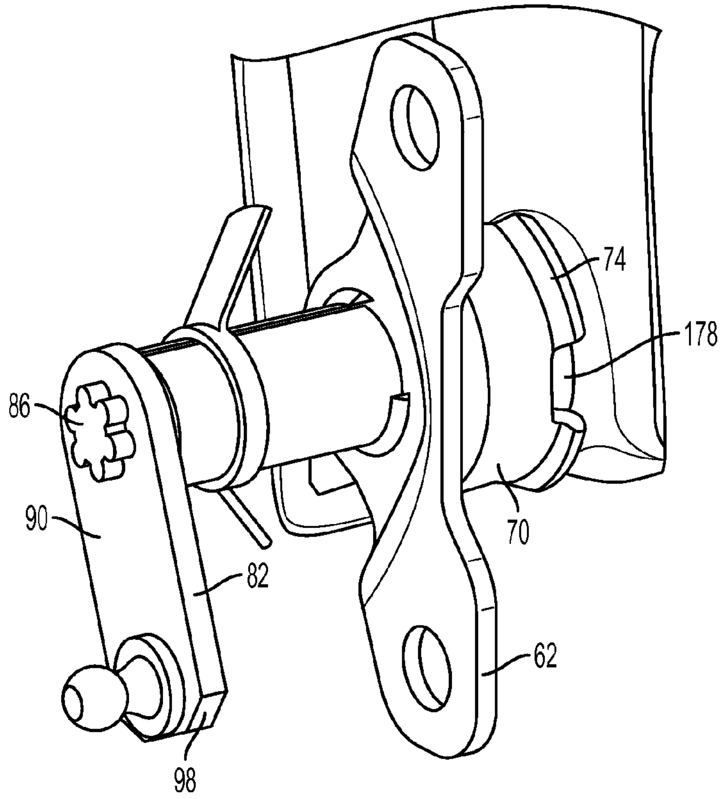
FIG. 13 is a detailed perspective view of the second corner bracket and the second hinge bracket of FIG. 9
Figure 14:
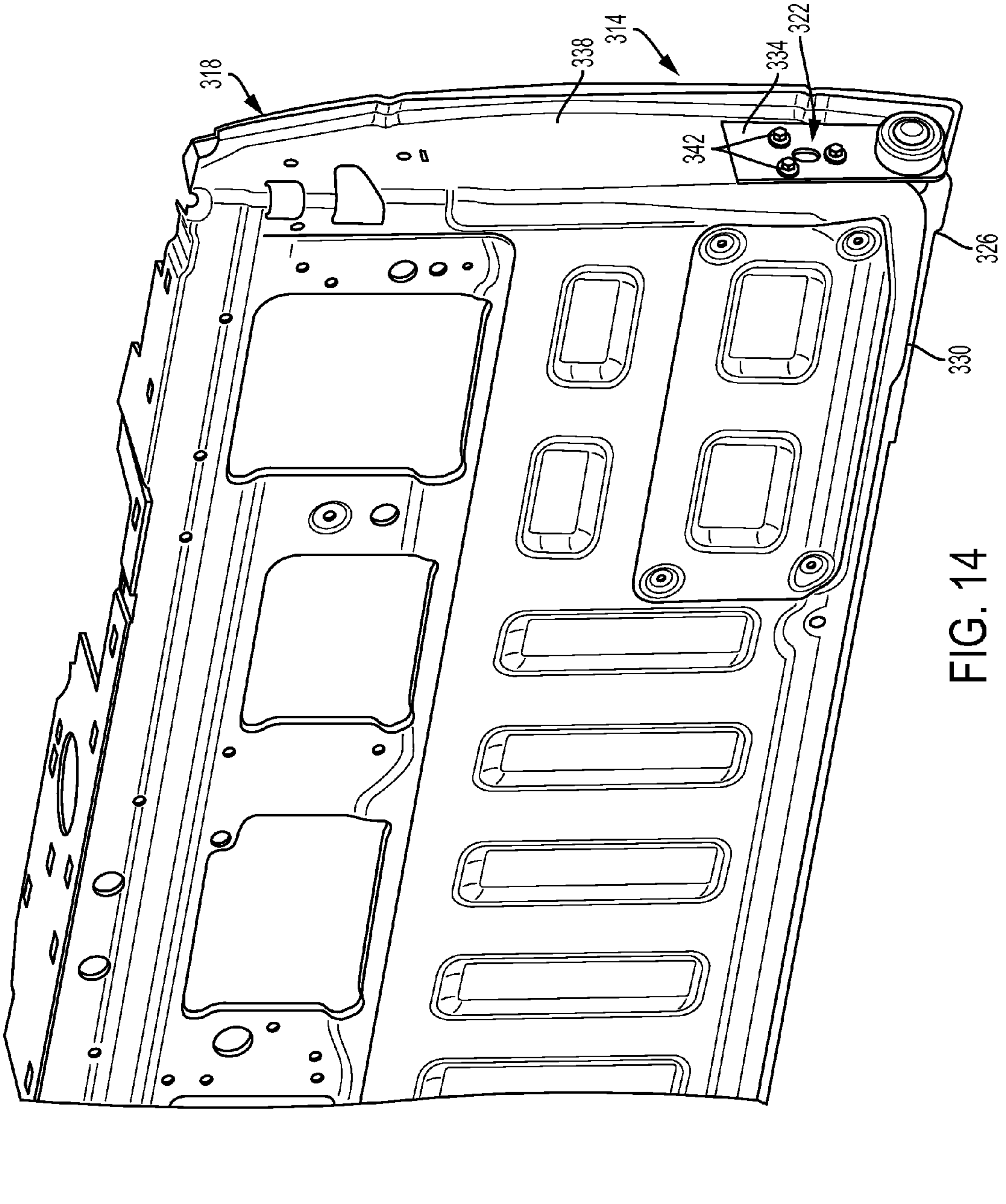
FIG. 14 is a perspective view of a tailgate and power closure system in accordance with another embodiment.
Figure 15:
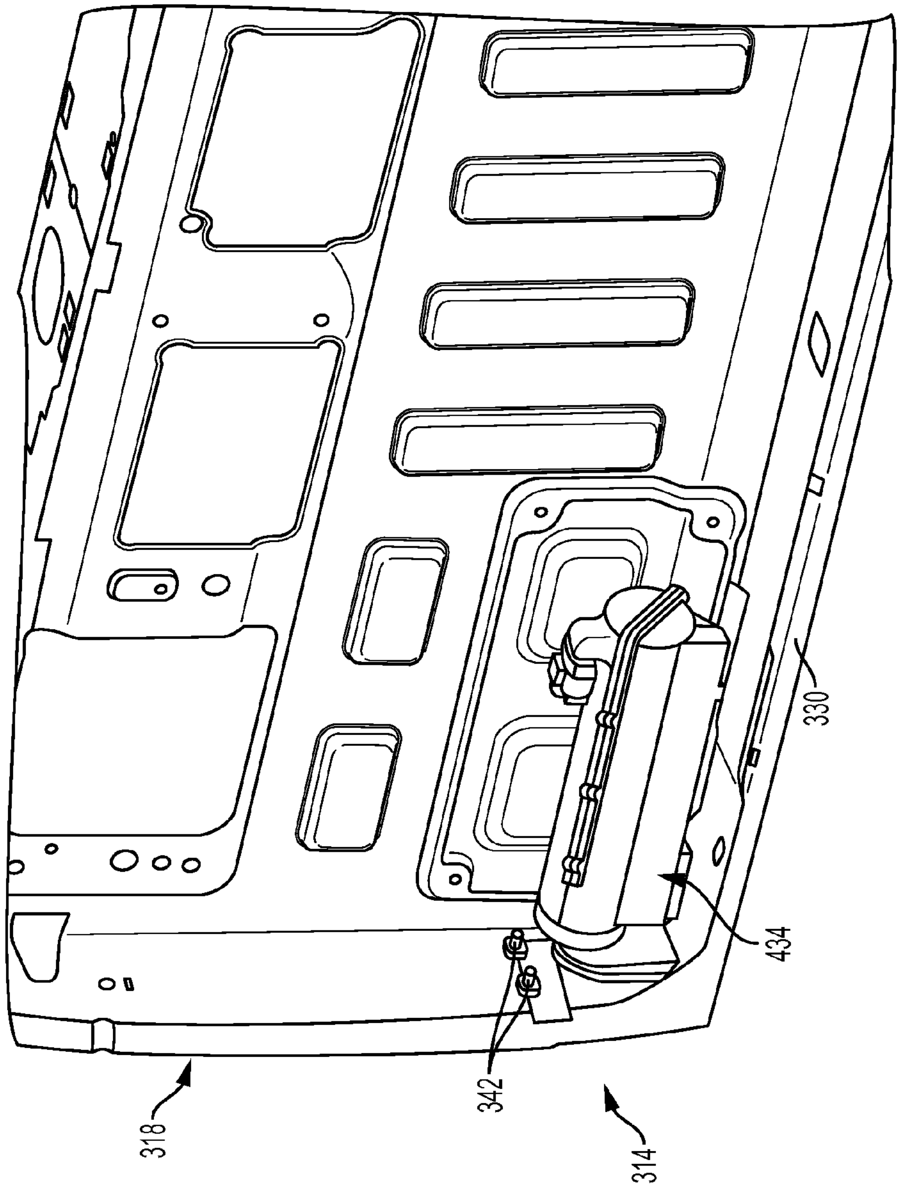
FIG. 15 is a perspective view of the lift gate of FIG. 14, with a front portion of the lift gate removed, illustrating a motor and a portion of a 4-bar linkage assembly.
Figure 16:
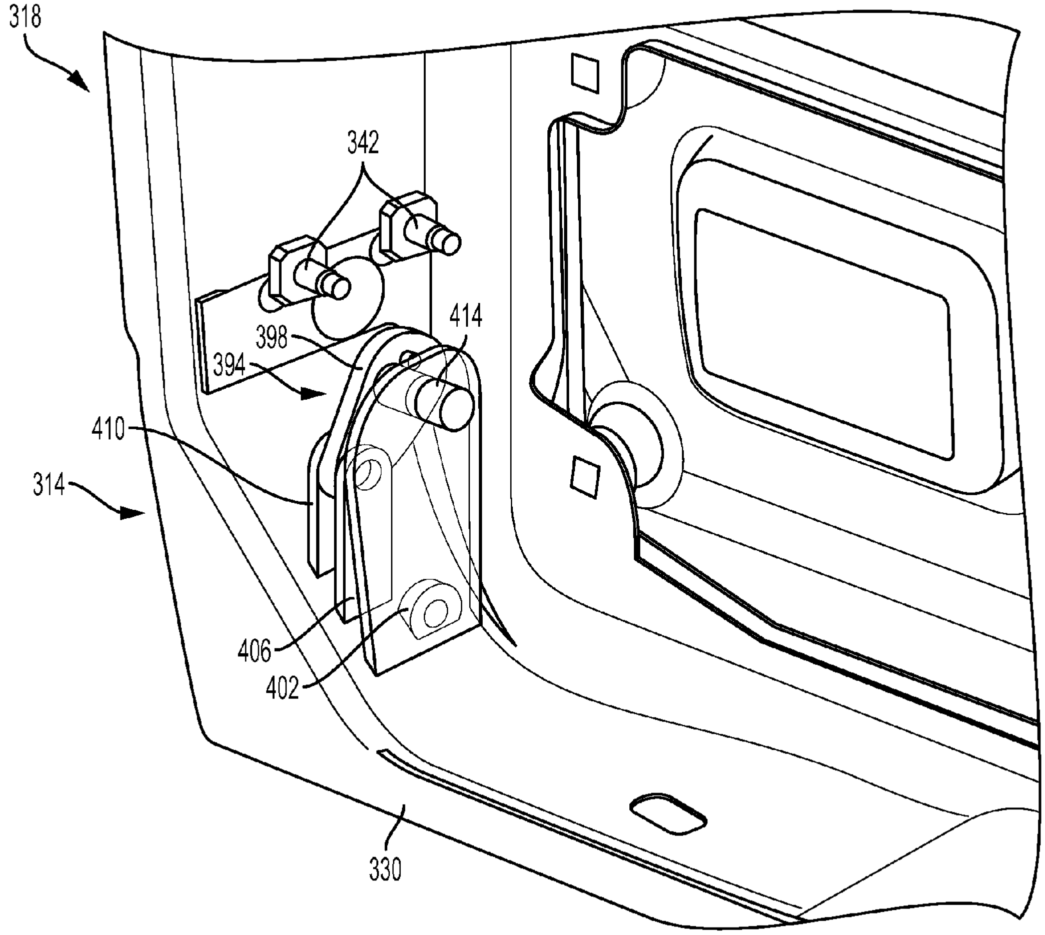
FIGS. 16-21 are perspective views of the 4-bar linkage assembly.
Figure 17:
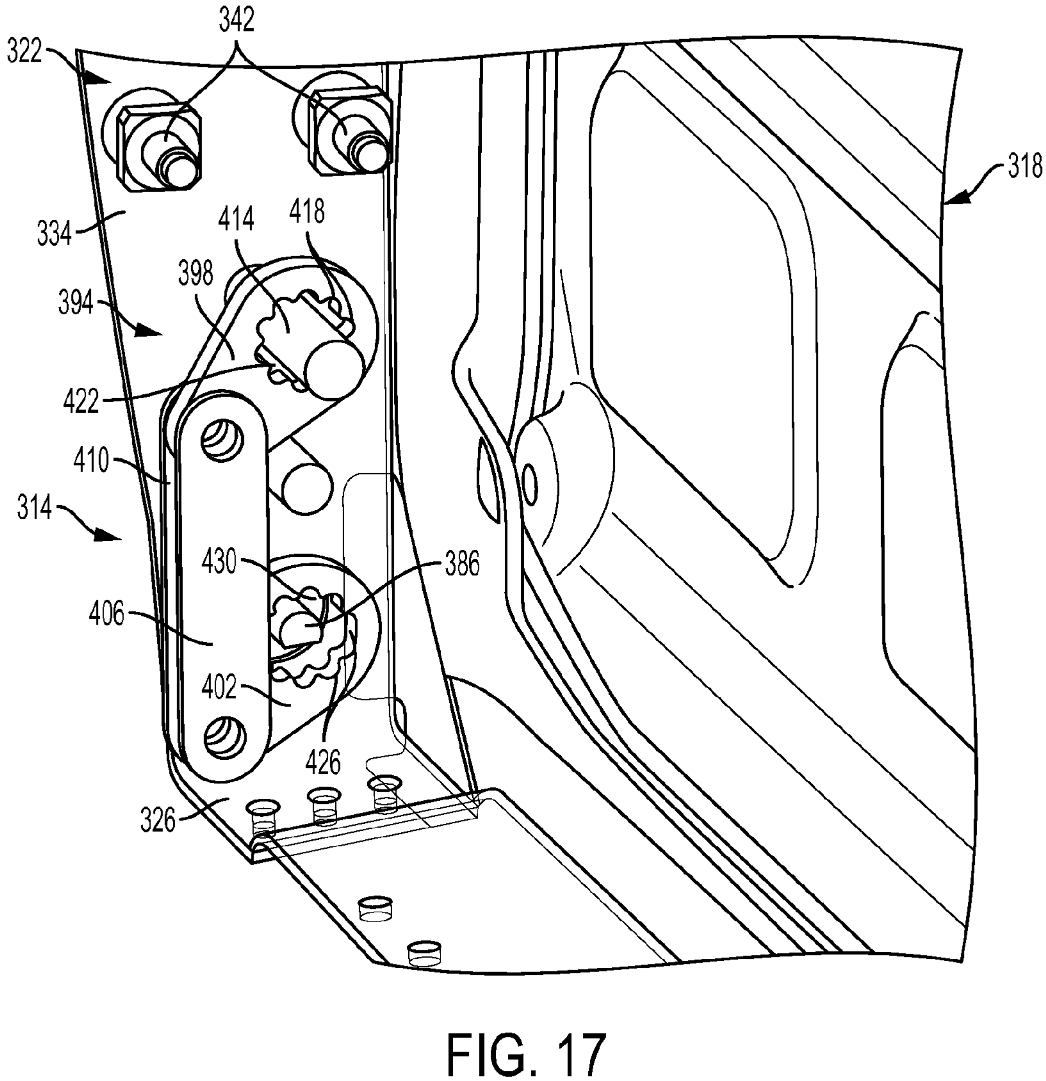

Illustrated in FIGS. 10 and 11, the motor assembly 250 of the powered closure system 14 includes an electric motor 262 positioned within the volume 110 of the tailgate 26 having a drive spindle 266 extending therefrom. During operation, the motor's spindle 266 is rotatable in a first direction, causing the tailgate 26 to rotate toward the opened position. In contrast, the motor's spindle 266 is also rotatable in a second direction, opposite the first direction, causing the tailgate 26 to rotate generally toward the closed position. The motor 262 is in electrical communication with the ECM 254 which provides the electoral signals necessary to drive the motor 262 for the duration and direction desired. In the illustrated embodiment, the output of the motor 262 is passed through multiple planetary gear sets 270 to increase the torque output of the motor 262.

The motor assembly 250 also includes an electromagnetic clutch 274 positioned between the output pinion 258 and the motor 262 and operatively connecting the two elements. Specifically, the clutch 274 is operable in an engaged configuration, where torque is transmitted between the motor 262 and the output pinion 258, and a disengaged configuration, where torque is not transmitted between the motor 262 and the output pinion 258. During use, the clutch 274 defaults to the disengaged configuration (e.g., when the clutch 274 is not energized) allowing the user to manually open and close the tailgate 26 without the added forces involved in backdriving the motor 262 and planetary gears 270. Similar to the motor 262, the clutch 274 is in electrical communication with the ECM 254 which in turn provides the necessary signals to determine when the clutch 274 is in the engaged and disengaged configurations.

The motor assembly 262 also includes a position sensor 278 operable to record the position of the tailgate 26 with respect to the closure frame 22. In the illustrated embodiment, the position sensor 278 is a Hall Effect sensor; however, in alternative embodiments other types of position sensors may be used. The position sensor 278 is positioned between the clutch 274 and the output pinion 258 so that the position sensor 278 will not lose its position when the clutch disengages from the motor 262. As such, the position sensor 278 is able to record the location of the tailgate 26 regardless of whether the system 14 is operating in a manual mode or an automatic mode and regardless of whether the clutch 274 is in the engaged configuration or disengaged configuration. The position sensor 278 is in electrical communication with the ECM 254.

The motor assembly 262 also includes an abusive slip device 282 positioned between the motor 262 and the output pinion 258 and configured to disengage when an abusive or excessively large force propagates through the assembly 14. The slip device 282 operates separately from the clutch 274 being configured to release (e.g., stop the transmission of torque) based on the forces within the system rather than the mode of operation. During use, the slip device 282 is configured to protect the clutch 274, motor 262, and gear sets 270 from potential damage by disengaging the torque transfer between the output pinion 258 and those elements when the forces exceed a predetermined limit.

The motor assembly 250 also includes an output pinion 258 selectively driven by the motor 262 and meshingly engaging a section gear 286 coupled to the collar 234 (described below). During use, the output pinion 258 transmits the torque provided by the motor 262 and transmitted by the clutch 274 to the section gear 286 which ultimately causes the tailgate 26 to rotate about the axis 182. In the illustrated embodiment, the output pinion 258 is a spur gear; however, in alternative embodiments the torque may be transmitted in alternative forms, such as by belt, helical gears, and the like.

Figure 8:
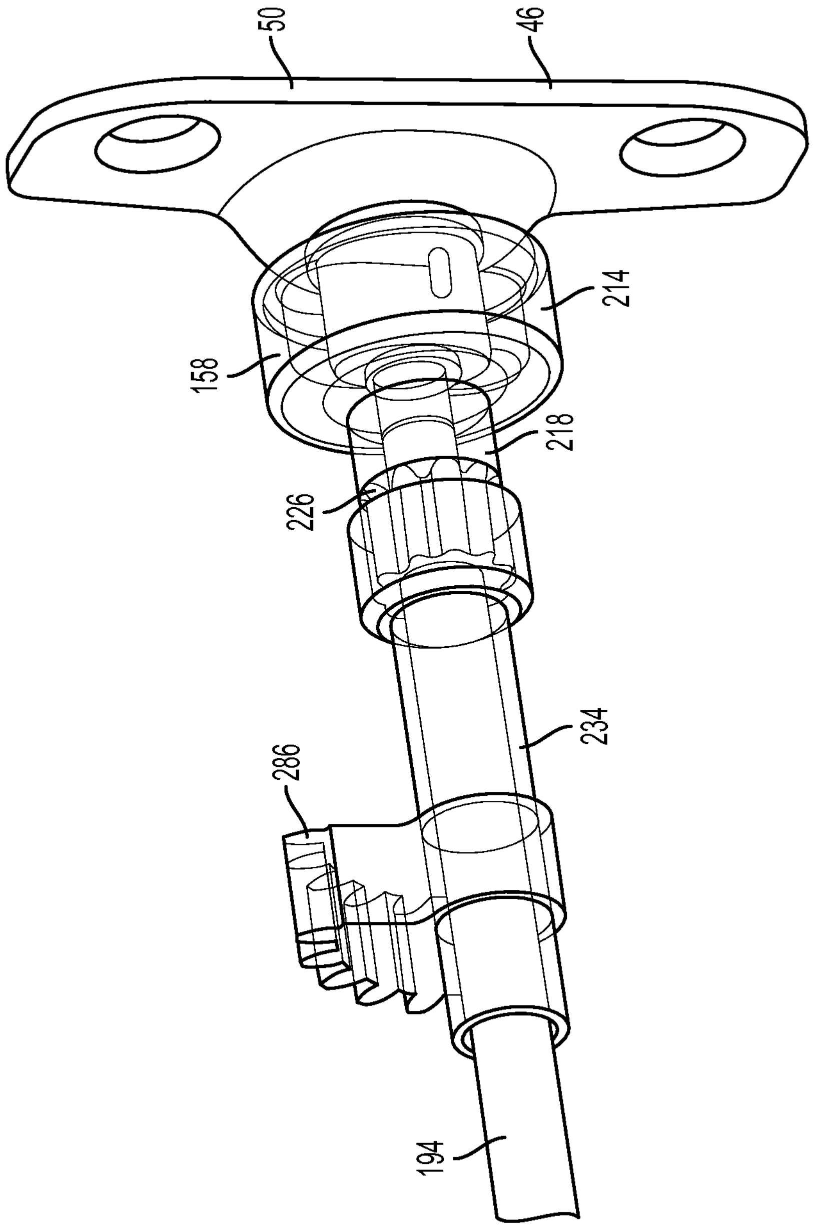
FIG. 8 is a detailed perspective view of a first hinge bracket of the power closure system of FIG. 5.
Figure 9:
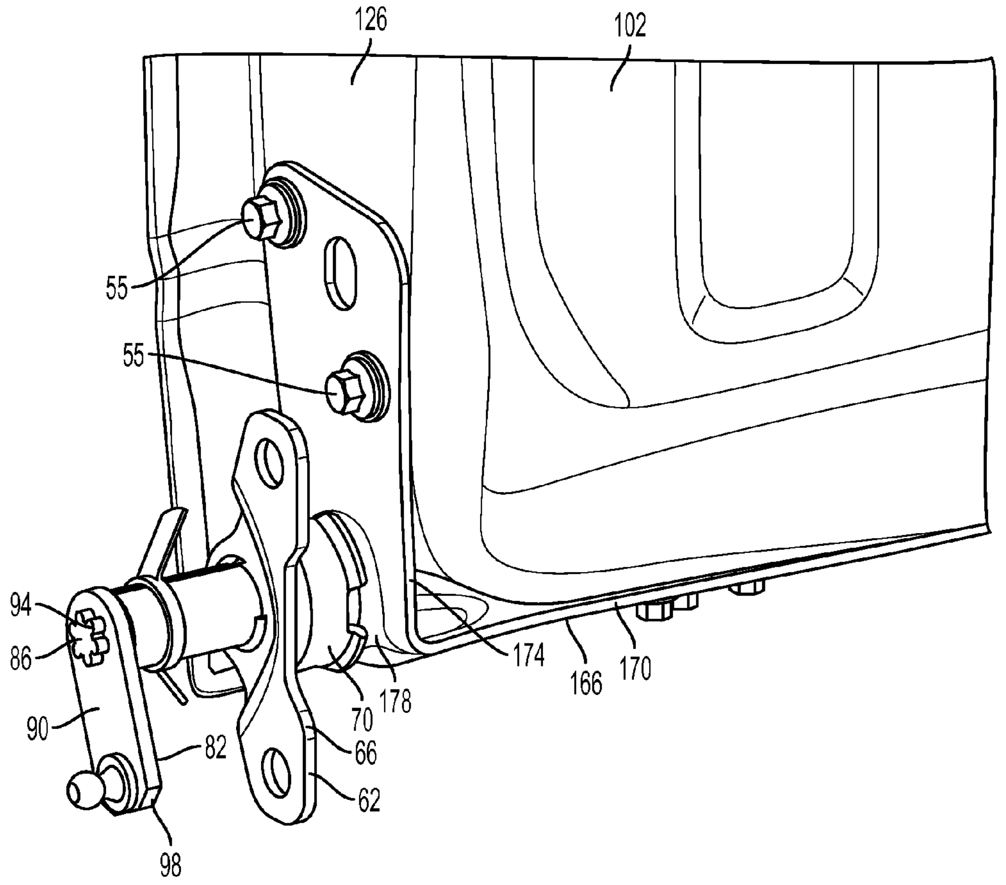
FIG. 9 is a detailed perspective view of a second corner bracket and a second hinge bracket of the power closure system of FIG. 5.

Illustrated in FIGS. 6-8, the collar 234 of the drive assembly 14 is substantially cylindrical in shape defining a channel 290 through which the torque bar 294 may pass. The collar 234 also includes a set of interior splines 294 proximate a first end 298 configured to engage the exterior splines 226 of the coupler 158. During use, the collar 234 transmits torque between the motor assembly 250 and the coupler 158 by way of the splines 294. In the illustrated embodiment, the collar 234 and the coupler 158 are rotationally fixed and rotate as a unit.

The collar 234 also includes a section gear 298 rotationally fixed thereto. When assembled, the section gear 298 is configured to meshingly engage with the output pinion 258 of the motor assembly 250 allowing the transfer of torque therebetween. In the illustrated embodiment, the section gear 298 only extends over a 90 degree arc to conserve space within the volume 110 of the tailgate 26; however, in alternative embodiments an entire gear may be used.

During normal operation, the closure system 14 will default in the manual mode of operation. In the manual mode of operation, the clutch 274 is in the disengaged configuration isolating the motor 262 and planetary gears 270 from the output pinion 258. As such, the user may operate the tailgate 26 in the typical fashion, manually pivoting the tailgate between the open and closed positions, about the axis 182, without the added burden of backdriving the motor 262 and gears 279. Furthermore, given the location of the clutch 274, the position sensor 278 remains engaged with the output pinion 258 and continues to track the location of the tailgate 26 with respect to the closure opening 22. Further still, the counterbalance forces provided by the torque bar system 190 and the bell crank assembly 82 will continue to operate normally while the closure system 14 is in the manual mode of operation.

To operate the closure system 14 in the automatic mode of operation, the user first provides an input, such as pressing a button on a key FOB, lifting the tailgate handle (not shown), and the like. The input is received by the ECM 254 which in turn sends a signal to the motor 262 causing it to begin rotating the drive spindle 266 in a second direction. At the same time, the ECM 254 instructs the clutch 274 to switch from the disengaged configuration to the engaged configuration, allowing the transmission of torque between the motor 262 and the output pinion 258. The output pinion 258 transmits the torque through the section gear 298 to the collar 234, which in turn transmits the torque to the cargo bed 10 via the first hinge bracket 46. As such, the tailgate 26 begins to rotate about the axis 182 toward the closed position as the motor 262 turns in the second direction.

As the tailgate 26 rotates, the ECM continues to receive position information regarding the location of the tailgate 26 from the position sensor 278. The ECM continues to instruct the motor 262 to rotate until the tailgate 26 reaches the closed position. With the tailgate 26 in the closed position, the ECM shuts off the motor 262, and instructs the clutch 274 to return to the disengaged (e.g., manual mode) configuration. From the closed position, the user may return the tailgate 26 to the opened position by providing another input to the ECM 254. By doing so, the above steps will be repeated only with the motor 262 rotating in the first direction, causing the tailgate 26 to pivot in the opposite direction toward the opened position.

FIGS. 14-23 illustrate a powered closure system 314 according to another construction. The powered closure system 314 is used in conjunction with a tailgate or closure 318. As with the powered closure system 14, the powered closure system 314 operates to automatically open and/or close the tailgate 318.

With reference to FIGS. 14 and 17-23, the tailgate 318 includes a first corner bracket 322 coupled to the tailgate 318 proximate a lower-right corner of the tailgate 318. The first corner bracket 322 is substantially L-shaped having a first leg 326 in contact with a bottom wall 330 of the tailgate 318 and a second leg 334 in contact with a right wall 338 of the tailgate 318. In the illustrated construction, the first corner bracket 322 is coupled to the tailgate 318 with one or more fasteners 342. The corner bracket 322 is configured to provide additional rigidity and strength to the tailgate 318 while also providing a foundation for additional mounting elements.

Figure 18:
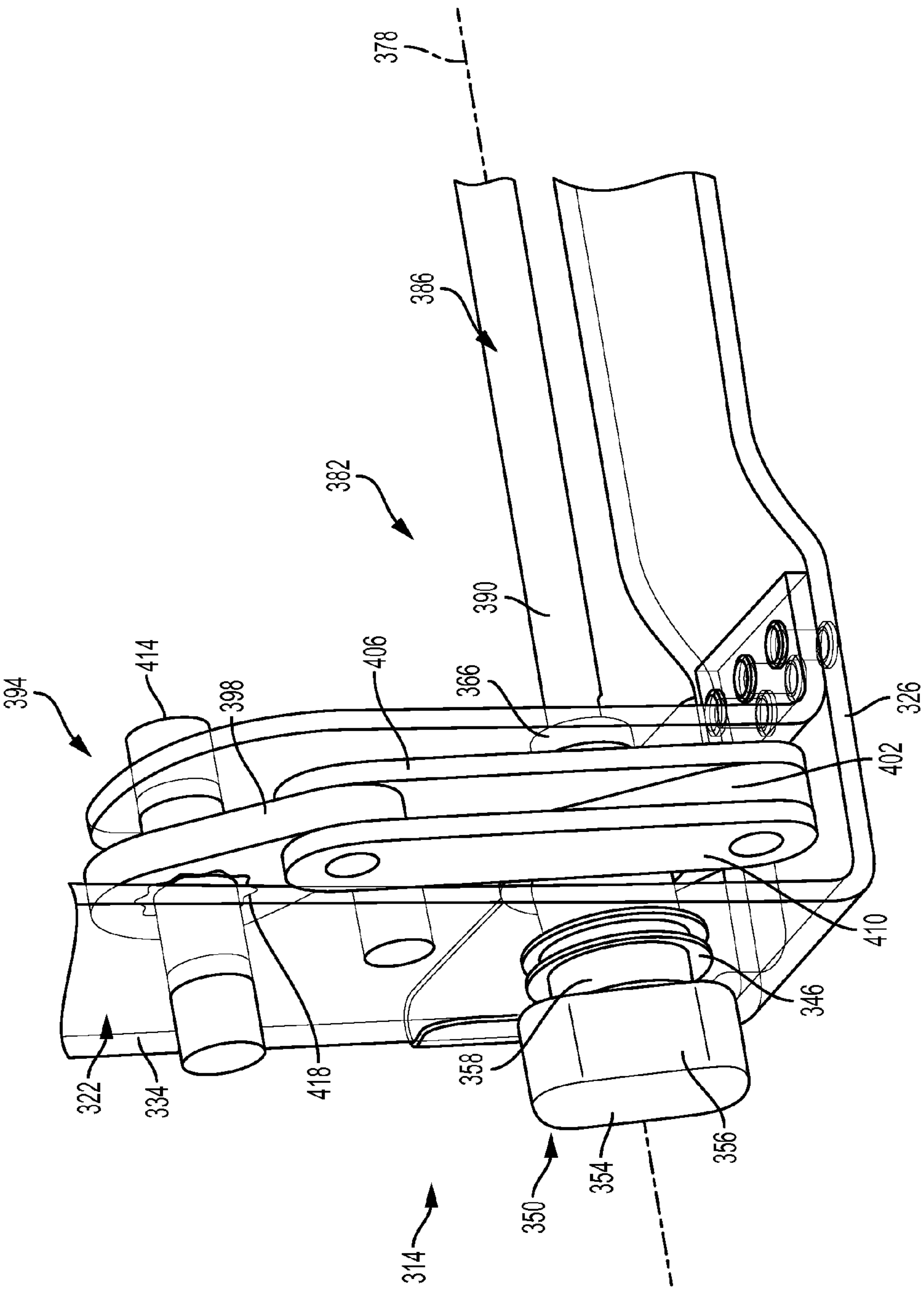
Figure 20:
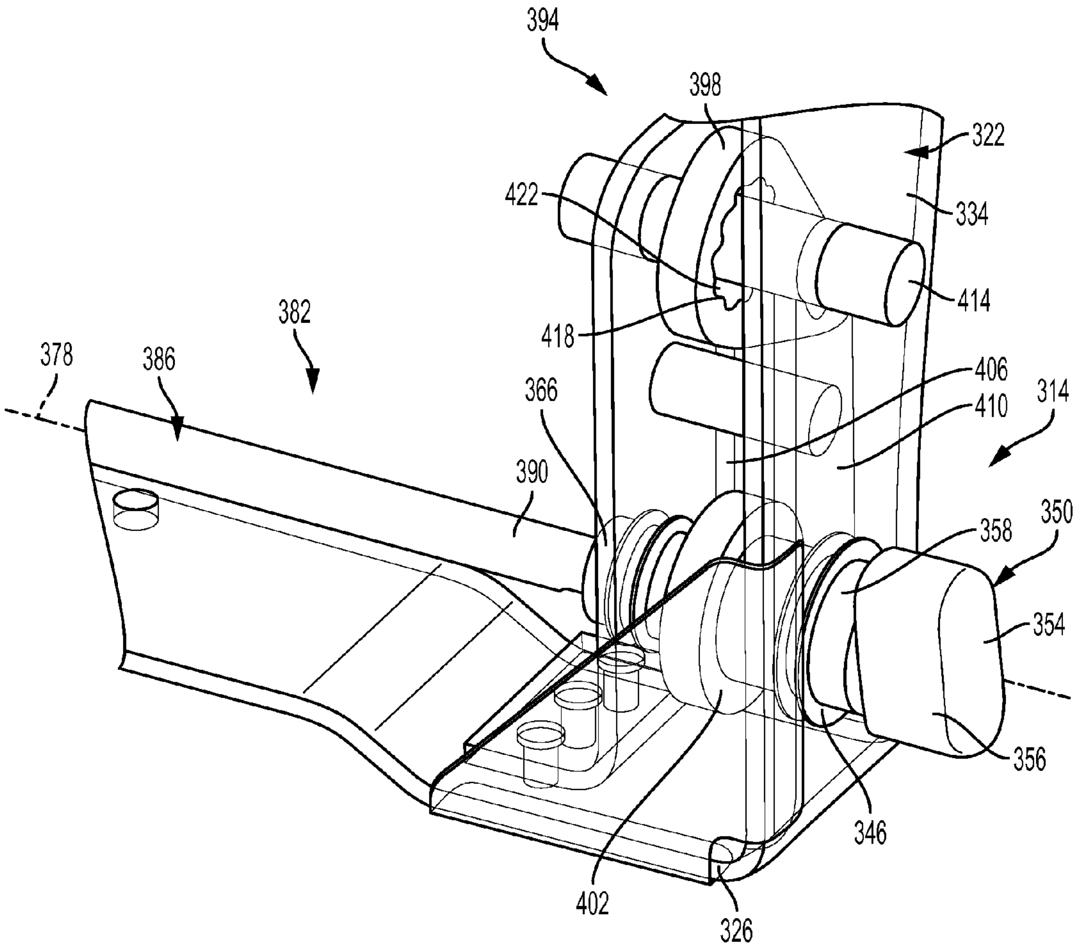
Figure 21:
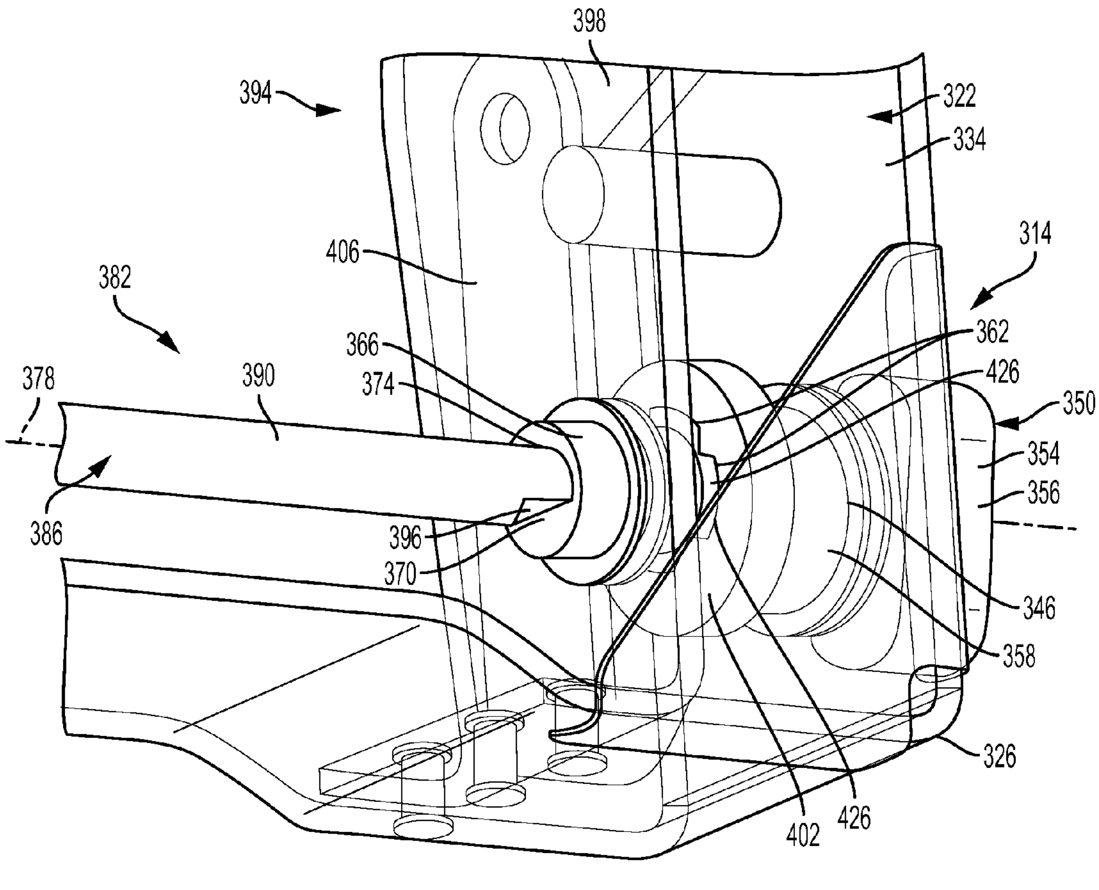

With reference to FIGS. 18, 20, and 21, the first corner bracket 322 includes an opening 346 that receives a coupler 350. At least a portion of the coupler 350 extends through the opening 346. The coupler 350 includes a first portion 354 disposed outside of the corner bracket 322 having a larger diameter than the diameter of the opening 346. In the illustrated construction the first portion 354 includes a keyed surface 356. In the illustrated construction the keyed surface 356 defines an oblong-shaped lug, although other constructions include different types of keyed surfaces. The keyed surface 356 is received into a bracket (e.g., a hinge bracket, not shown) on a cargo bed of the vehicle, such that the coupler 350 is rotationally fixed relative to the cargo bed of the vehicle.

Figure 19:
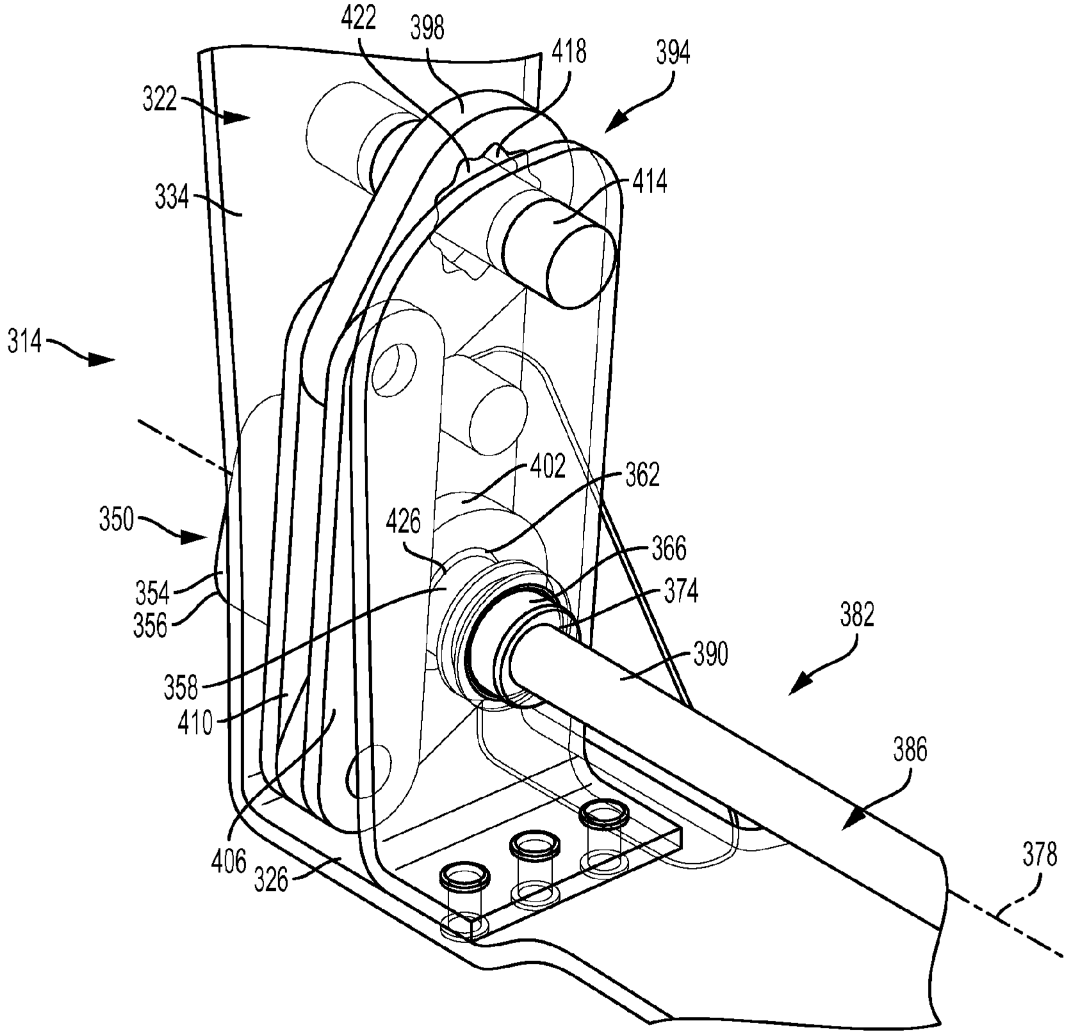

With reference to FIGS. 18-21, the coupler 350 further includes a second portion 358 that passes through the opening 346. The second portion 358 includes a keyed surface 362 (FIGS. 19 and 21). In the illustrated construction the keyed surface 362 defines a set of projecting splines spaced around a circumference of the second portion 358, although other constructions include different types of keyed surfaces.

With reference to FIGS. 18-21, the coupler further includes a third portion 366 that has a keyed surface 370 (FIGS. 19 and 21). In the illustrated construction the keyed surface 370 is a flat, planar surface within an otherwise cylindrical opening 374 in the third portion 366, although other constructions include different types of keyed surfaces. In the illustrated construction the third portion 366 has a smaller diameter than the second portion 358, although other constructions include different sizes and shapes for the third portion 366 than that shown. In some constructions the keyed surface 370 extends into the second portion 358, or into both the first and second portions 354, 358.

The tailgate 318 further includes a second corner bracket (not shown) positioned proximate a lower, left-hand corner of the tailgate 318 opposite the first corner bracket 322. Similar to the first corner bracket 322, the second corner bracket is substantially L-shaped having a first leg in contact with the bottom wall 330 of the tailgate 318 and a second leg in contact with a left-side wall of the tailgate 318.

As with the embodiment illustrated in FIGS. 1-13, in some constructions the second corner bracket also includes a substantially cylindrical hinge lug extending outwardly from the second leg of the second corner bracket. When the tailgate 318 is installed in a cargo bed, the hinge lug is at least partially received within a hinge cup of a hinge bracket.

Together, the opening 346 of the first corner bracket 322 and the hinge lug of the second corner bracket define an axis of rotation 378 (see FIGS. 18-21) extending substantially lengthwise along the tailgate 318 proximate the bottom wall 330. During use, the tailgate 318 pivots about this axis 378 between the open and closed positions. Furthermore, as with the embodiment in FIGS. 1-13, the components of the power closure system 314 are shaped such that the tailgate 318 can be easily removed from a cargo bed without the need for tools and the like.

Similar to the tailgate 26, the tailgate 318 also includes a latch mechanism (not shown) to secure the tailgate 318 in the closed position. During use, the latch mechanism may be released both manually, via the use of a handle (not shown), or automatically, by receiving a signal from a control unit.

With reference to FIGS. 18-21, the tailgate 318 also includes a torque bar system 382 configured to act as a counterbalance for the weight of the tailgate 318 as the tailgate 318 moves between the open and closed positions. Similar to the torque bar system 190 of FIGS. 1-13, the torque bar system 382 includes the coupler 350, along with a torque bar 386 (e.g., metal) having a first end 390 and a second end (not shown) opposite the first end 390. The first end 390 has a keyed surface 396 (FIG. 21) which keys onto the keyed surface 370 of the coupler 350, such that the first end 390 is fixedly coupled and rotationally locked to the coupler 350. In the illustrated construction the keyed surface 396 is a flat, planar surface along an otherwise cylindrical torque bar 386.

The torque bar system 382 further includes an anchor block (not shown) fixedly coupled to the second end of the torque bar 386 (e.g. via keyed surfaces), similar to the anchor block 206 in FIG. 5. During use, the rotational motion of the tailgate 318 with respect to a closure frame of the vehicle is transmitted to the torque bar 386 which, through torsion, creates a torque acting about the axis of rotation 378 opposite the moment created about the axis of rotation 378 by the weight of the tailgate 318. As such, the two forces at least partially cancel each other out, reducing the amount of force that is required to rotate the tailgate 318 between the opened position and the closed position.

During use, the torque bar 386 produces torque by way of torsion when the first end 390 is rotated with respect to the second end. For example, as the first end 390 of the torque bar 386 is rotated in a clockwise direction with respect to the second end, the torque bar 386 produces a torque in a direction resisting the twisting motion. The further the first end 390 of the torque bar 386 is rotated with respect to the second end, the greater the magnitude of the torque produced.

With reference to FIG. 21, the first end 390 of the torque bar 386 is rotationally fixed relative to the third portion 366 of the coupler 350 via the keyed surfaces 370, 396, and the first portion 352 of the coupler 350 is rotationally fixed relative to the cargo bed of the vehicle (not shown) via the keyed surface 356, such that the first end 390 of the torque bar 386 is always rotationally fixed in space, allowing the second end of the torque bar 386 to rotate and twist relative to first end 390.

With reference to FIGS. 16-23, the powered closure system 314 further includes a linkage assembly 394 coupled to the coupler 350 and the torque bar 386. In the illustrated construction the linkage assembly 394 is a four-bar linkage assembly that includes a first teardrop link 398, a second teardrop link 402, and two connecting links 406, 410 pivotally coupled to the first and second teardrop links 398, 402. During operation, the linkage assembly 394 is intended to transmit torque between an output shaft 414 of the motor assembly 434 and the coupler 350.

With reference to FIGS. 17-20, 22, and 23, the first teardrop link 398 is coupled to the output shaft 414 and one or more keyed surfaces 418 on the first teardrop link 398. In the illustrated construction the keyed surfaces 418 include inner grooved surfaces within the first teardrop link 398 that extend around an opening 422 in the first teardrop link 398. While not illustrated, in some constructions the output shaft 414 includes outer splines, or is coupled to a further connector that includes outer splines, that are received in the keyed surfaces 418 of the first teardrop link 398, so as to couple the first teardrop link 398 to the output shaft 414.

With continued reference to FIGS. 17-20, 22, and 23, the second teardrop link 402 is coupled to the second portion 358 of the coupler 350 via keyed surfaces 426. In the illustrated construction the keyed surfaces 426 are inner grooved surfaces within the second teardrop link 402 that extend around an opening 430 in the second teardrop link 402. As illustrated in FIG. 21, the keyed surfaces 426 engage the keyed surfaces 362 on the coupler 350.

Figure 23:
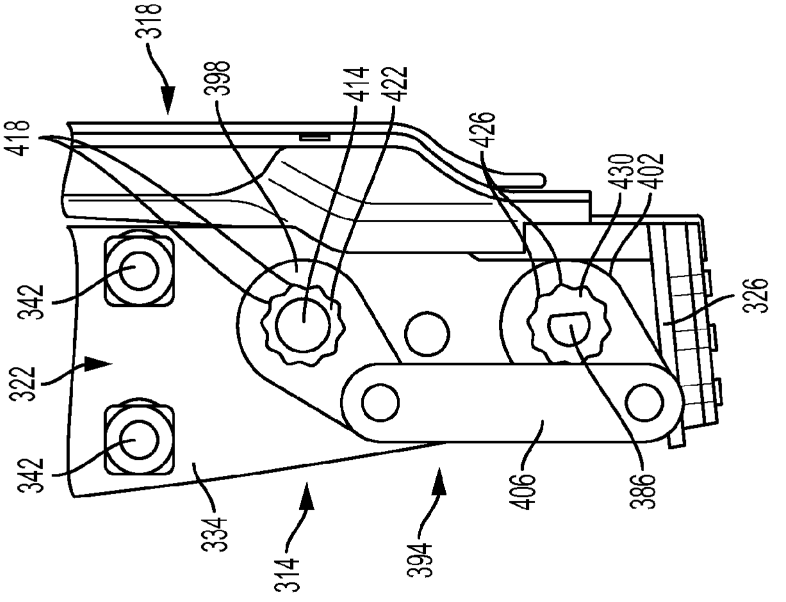
FIG. 23 is a side view of the lift gate of FIG. 14 in a closed position.
Figure 22:
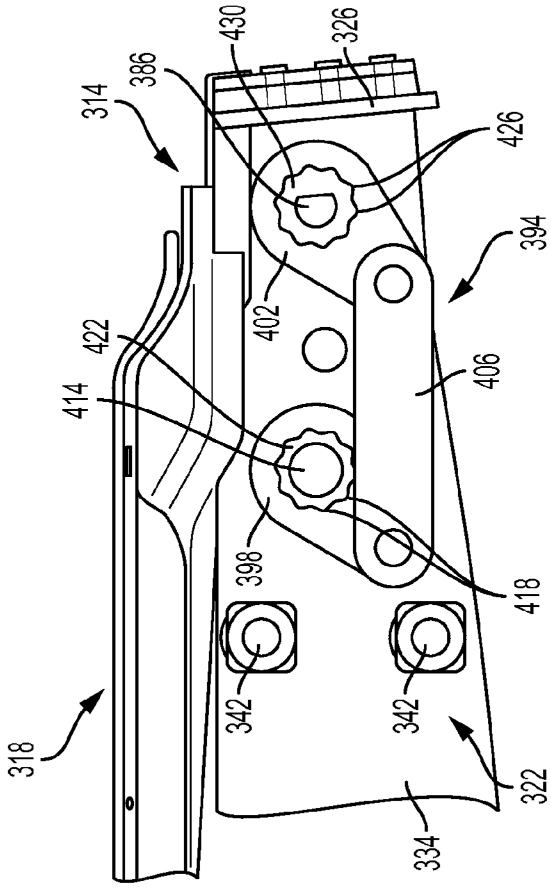
FIG. 22 is a side view of the lift gate of FIG. 14 in an opened position.
Figure 24B:
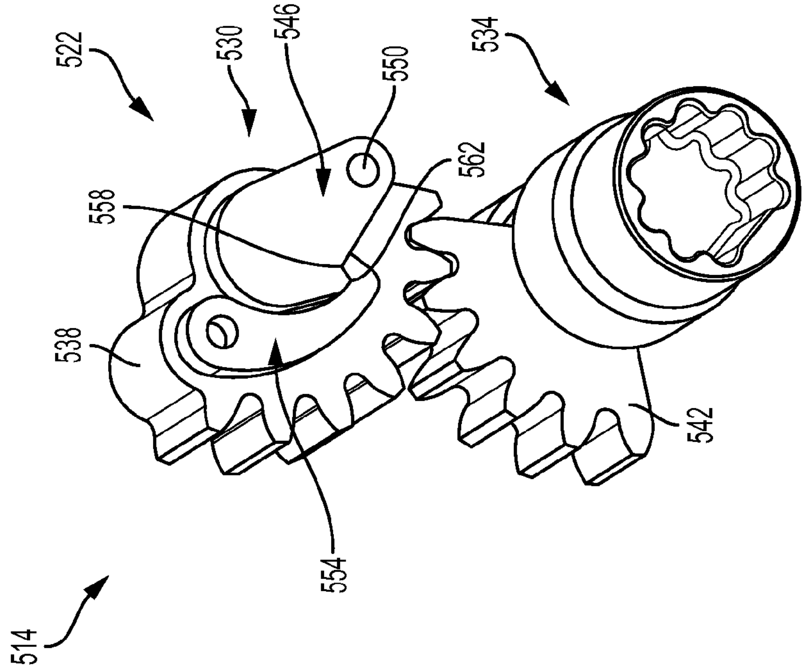
FIGS. 24A and 24B are perspective views of a decoupling assembly according to one embodiment for use on a power closure system.
Figure 24A:
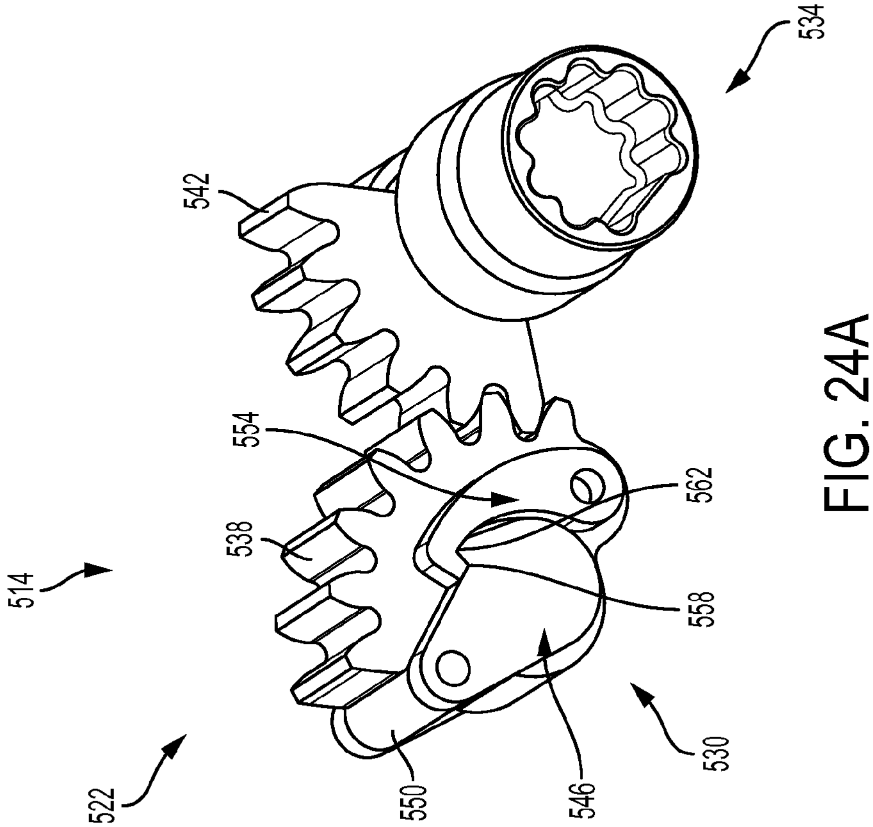

With reference to FIGS. 21, 22 and 23, during movement of the tailgate 318 between the open and closed positions, the second teardrop link 402 remain rotationally and translationally fixed, due to its splined connection with the rotationally fixed coupler 350.

With reference to FIGS. 15 and 18-21, the powered closure system 314 includes a motor assembly 434 (e.g., the same motor assembly as motor assembly 250 in FIGS. 1-13) that drives movement of the tailgate 318. In the illustrated construction, the motor assembly 434 imparts torque on the output shaft 414 which in turn is coupled to both the coupler 350 and the torque bar 386 via the linkage assembly 394. The powered closure system 314 further includes an electric control module (ECM) (not shown, but for example the same as ECM 254 in FIGS. 1-13) operable to control the operation of the motor assembly 434. The ECM is coupled to the vehicle's electrical system through a detachable cable junction (not shown). During use, the motor assembly 434 drives the output shaft 414 which in turn drives the coupler 350 via the linkage assembly 394 causing the tailgate 318 to rotate. The powered closure system 314 automatically rotates the tailgate 318 between the opened position and the closed position and is operable in both a manual and automatic mode.

FIGS. 24-28 illustrate a powered closure system 514 according to another construction. The powered closure system 514 is used in conjunction with a tailgate 518. As with the powered closure systems 14 and 314, the powered closure system 514 operates to automatically open and/or close the tailgate 518.

With reference to FIGS. 24-28, the powered closure system 514 includes a decoupling assembly 522 that selectively couples and decouples a motor 526 from the tailgate 518. For example, as illustrated in FIGS. 24-27, the decoupling assembly 522 includes a driving portion 530, as well as a driven portion 534 that is configured to engage with the driving portion 530 to allow transfer of torque therebetween to power the opening and closing of the tailgate 518. The driving portion 530 includes a first toothed gear 538 (e.g., similar to the output pinion 258 illustrated in FIG. 7), and the driven portion 534 includes a corresponding second toothed gear 542 (e.g., similar to the section gear 298 in FIG. 7) that engages with the first toothed gear 538. The driving portion 530 also includes a driving member 546 coupled to the motor 526, a drive lug 550 coupled (e.g. fixed) to the driving member 546 that engages and disengages with the first toothed gear 538, and a spring-loaded pawl 554 coupled (e.g., rotationally coupled) to the first toothed gear 538 that engages and disengages with the driving member 546.

Figure 25:
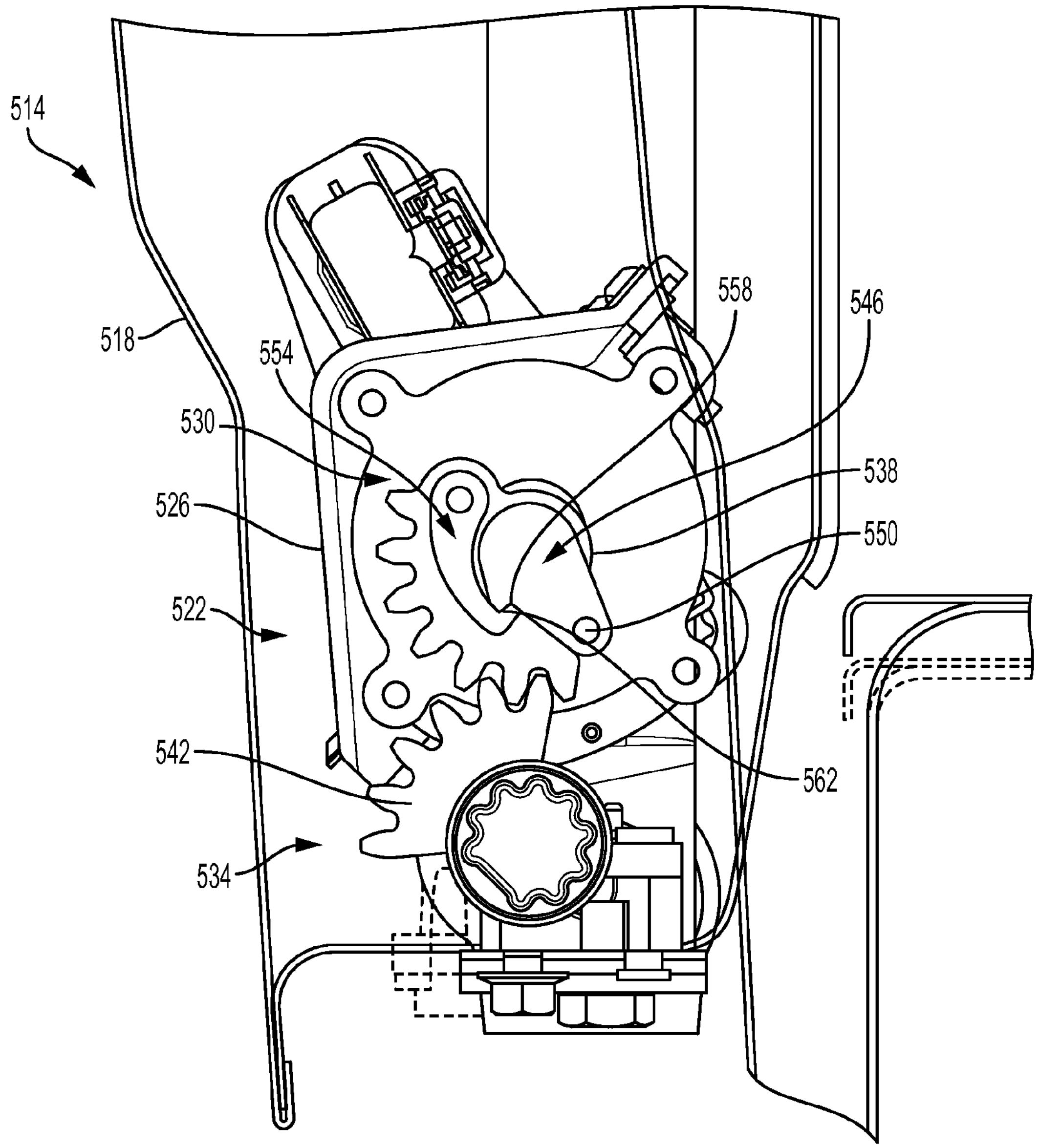
FIG. 25 is a front view of the decoupling assembly disposed on a power closure system, with a gate in a closed position.

With reference to FIG. 25, to open the tailgate 518 the driving member 546 and the drive lug 550 are rotated in a first direction (e.g., counterclockwise in FIG. 25) via the motor 526. An opening force is transmitted from the driving member 546 through the pawl 554 and to the first toothed gear 538 to rotate the first toothed gear 538 and the second toothed gear 542.

Figure 26:
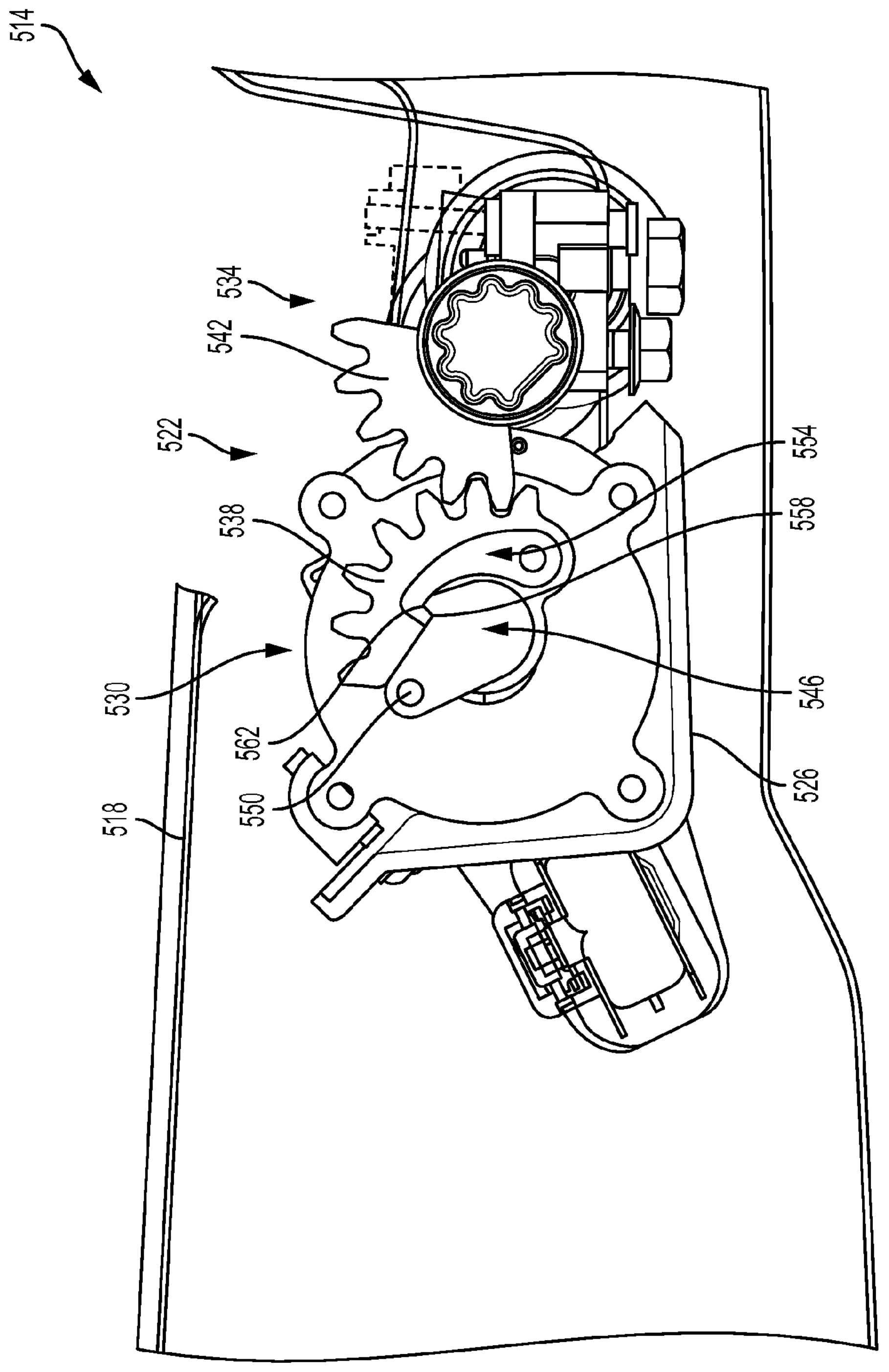
FIG. 26 is a front view of the decoupling assembly, with the gate in an opened position.

With reference to FIG. 26, to close the tailgate 518 the driving member 546 and the drive lug 550 are rotated in an opposite direction (e.g., clockwise in FIG. 26) via the motor 526. A closing force is transmitted from the driving member 546 through the drive lug 550 and to the first toothed gear 538 to rotate the first toothed gear 538 and the second toothed gear 542.

Figure 27:
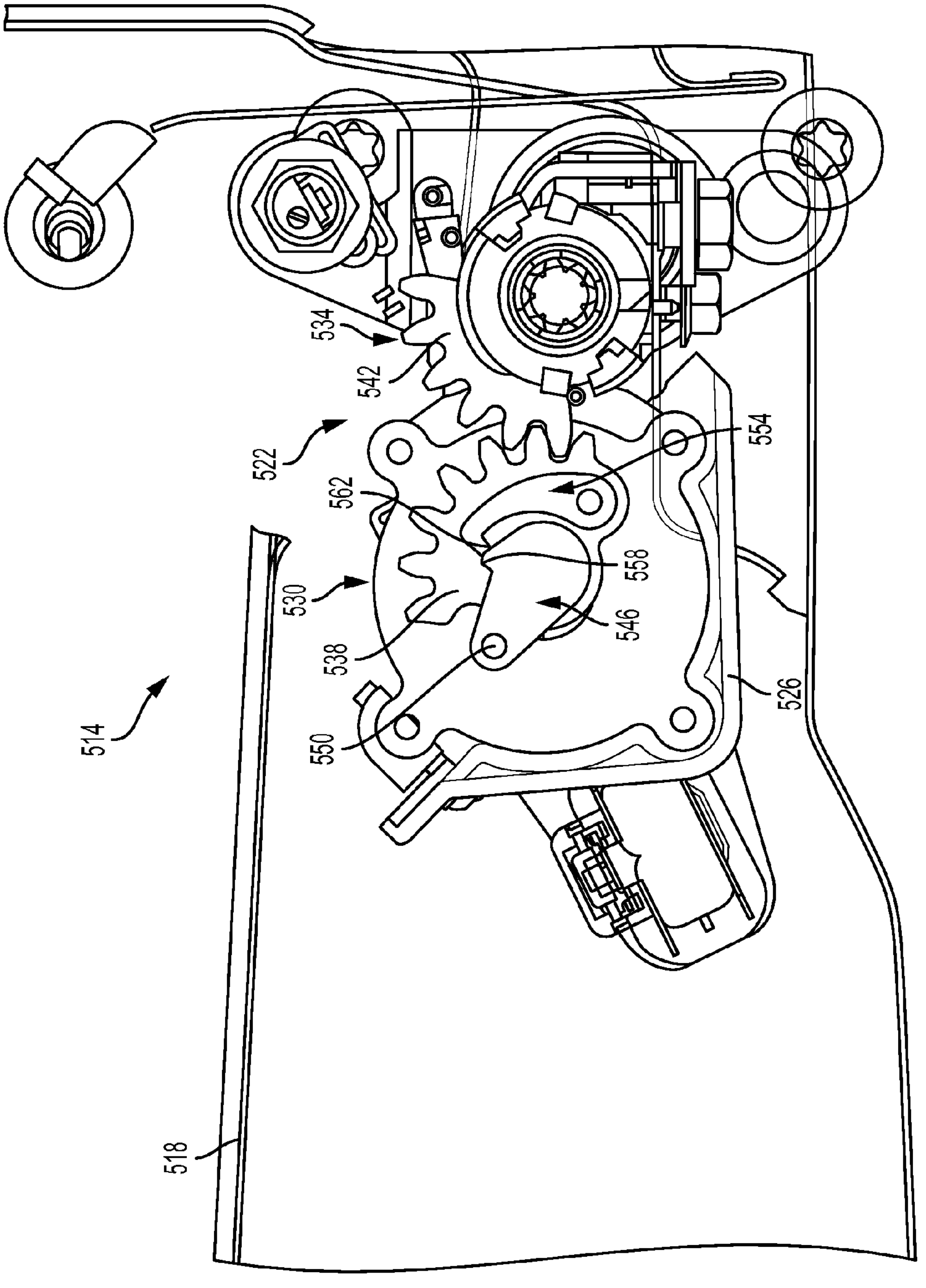
FIG. 27 is a front view of the decoupling assembly, with the gate in the opened position and the vehicle out of park.

With reference to FIG. 27, when the tailgate 518 is fully opened, the driving member 546 and the drive lug 550 may be rotated counterclockwise past the position illustrated in FIG. 26 until the spring-loaded pawl 554 releases from the driving member 546. For example, in the illustrated construction the driving member 546 includes a first surface (e.g., a ledge) 558, and the pawl 554 includes a second surface (e.g., a portion of a projection) 562 that engages and disengages with the first surface 558 depending on a rotational position of the driving member 546. Releasing the pawl 554 from the driving member 546 decouples the motor 526 from the tailgate 518, allowing the tailgate 518 to bounce freely in the opened position. In some constructions the driving member 546 is rotated, or may be rotated, to the position illustrated in FIG. 27 only when the vehicle is out of park (e.g., only when the vehicle is in drive).

With continued reference to FIG. 27, to close the tailgate 518 after the motor 526 has been decoupled from the tailgate 518, the motor 526 is first activated, causing the driving member 546 to begin to rotate (e.g., clockwise in FIG. 27). The driving member 546 rotates until the drive lug 550 re-engages the first toothed gear 538, thereby generating rotational movement of the first toothed gear 538 and the second toothed gear 542. As the driving member 546 rotates, the second surface 562 of the spring-loaded pawl 554 also engages (e.g., slides back or snaps onto via the spring force) the first surface 558, thereby fully re-engaging the pawl 554 with the driving member 546.

Figure 28:
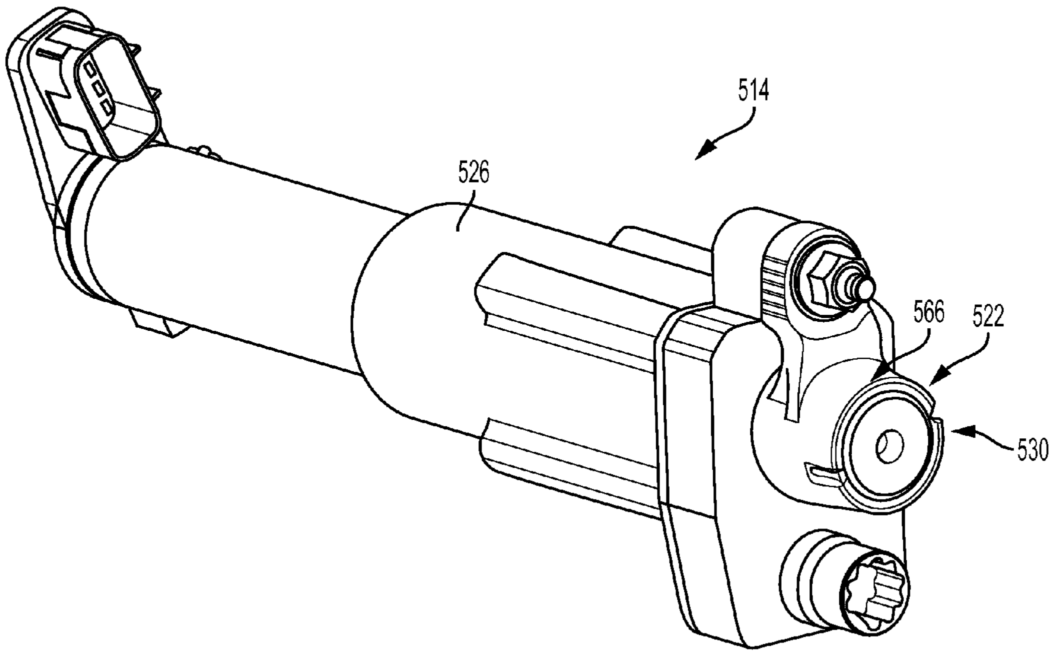
FIG. 28 is a perspective view of a motor assembly for use on a power closure system, the motor assembly including a rotary hydraulic damper.

With reference to FIG. 28, in some constructions the powered closure system 514 also includes a rotary hydraulic damper 566 that is coupled to the driving portion 530 (e.g., to the first toothed gear 538). The rotary hydraulic damper 566 provides dampening when the tailgate 518 is opened. In other constructions the hydraulic damper 566 is not included, or is used to provide dampening when the tailgate 518 is opened, or is used to provide dampening both when the tailgate 518 is opened and closed.

FIGS. 29-32 illustrates a powered closure system 614 according to another construction. The powered closure system 614 is used in conjunction with tailgate 26' and cargo bed 10', each of which are identical to tailgate 26 and cargo bed 10 as described above. As such, identical elements have been given the same reference number with the addition of a prime symbol. As with the powered closure systems 14, the powered closure system 614 operates to automatically open and/or close the tailgate 26' with respect to the cargo bed 10' (not shown). Except as indicated otherwise, the powered closure system 614 is substantially similar to powered closure system 14.

Figure 29:
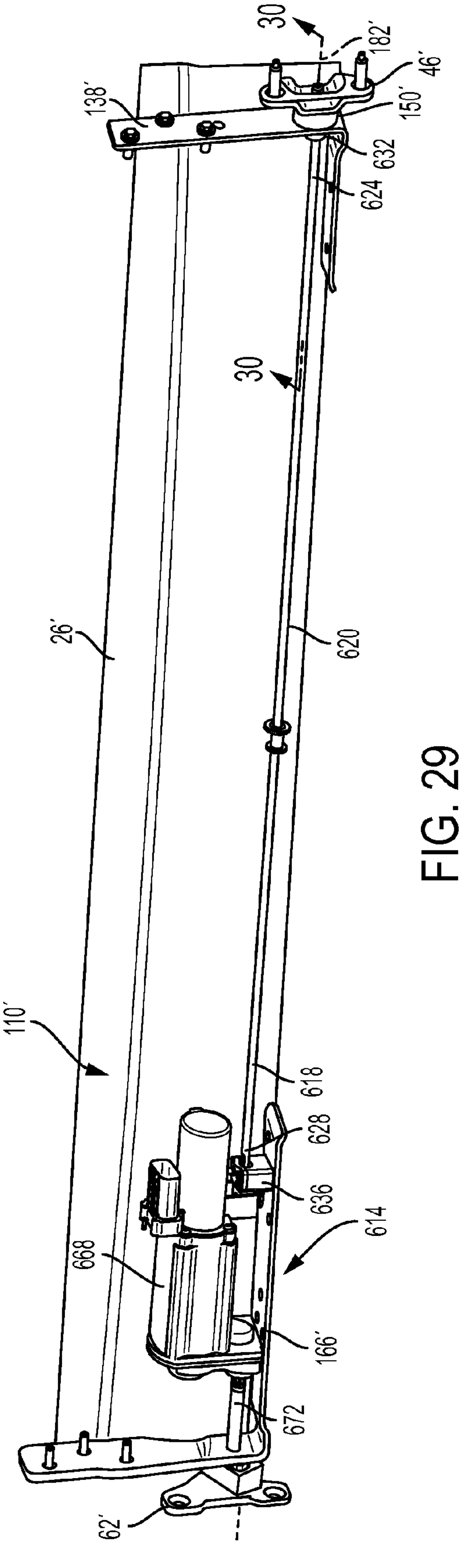
FIG. 29 is a perspective view of a tailgate and power closure system in accordance with another embodiment.
Figure 30:
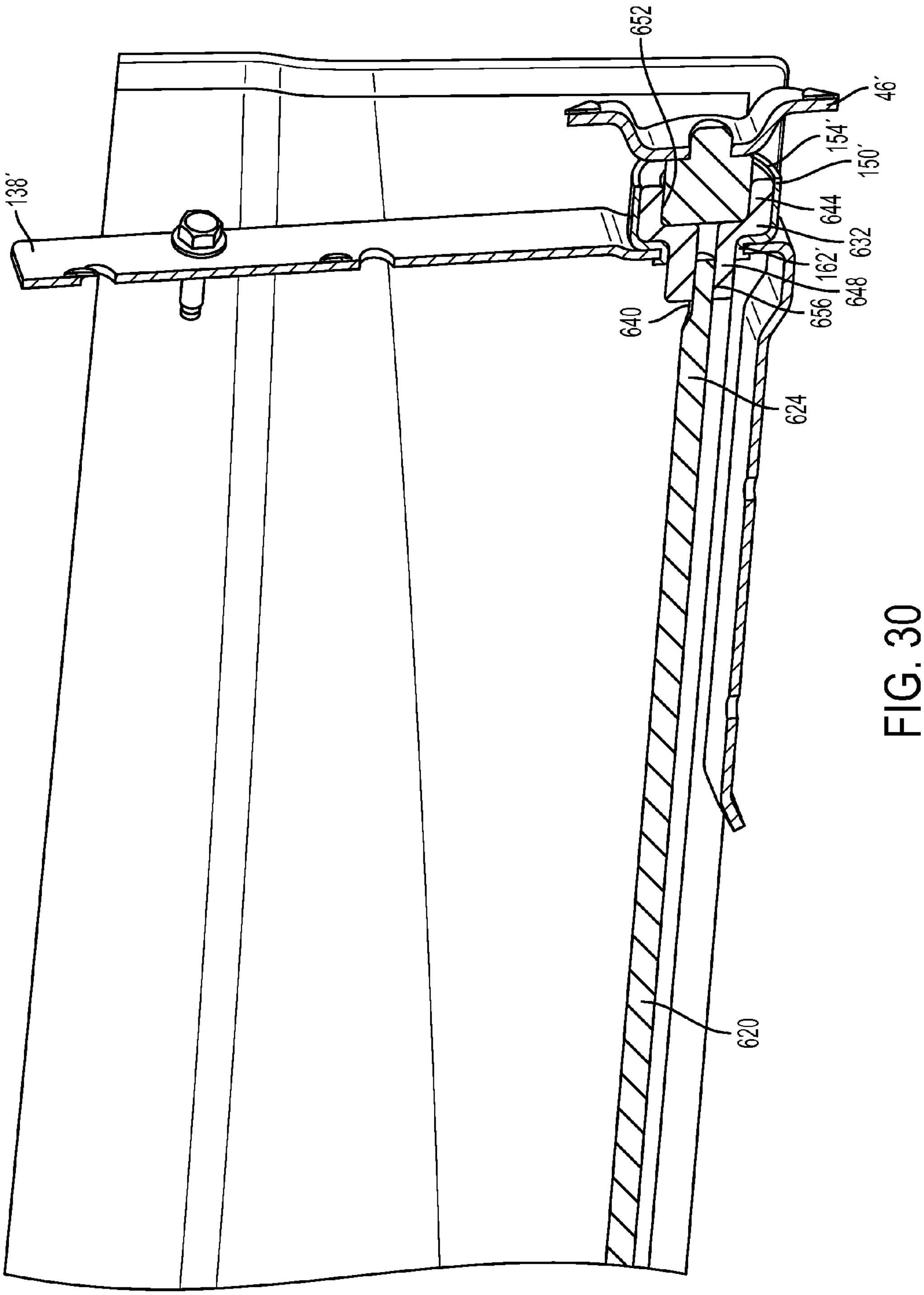
FIG. 30 is a section view taken along line 30-30 of FIG. 29.
Figure 31:
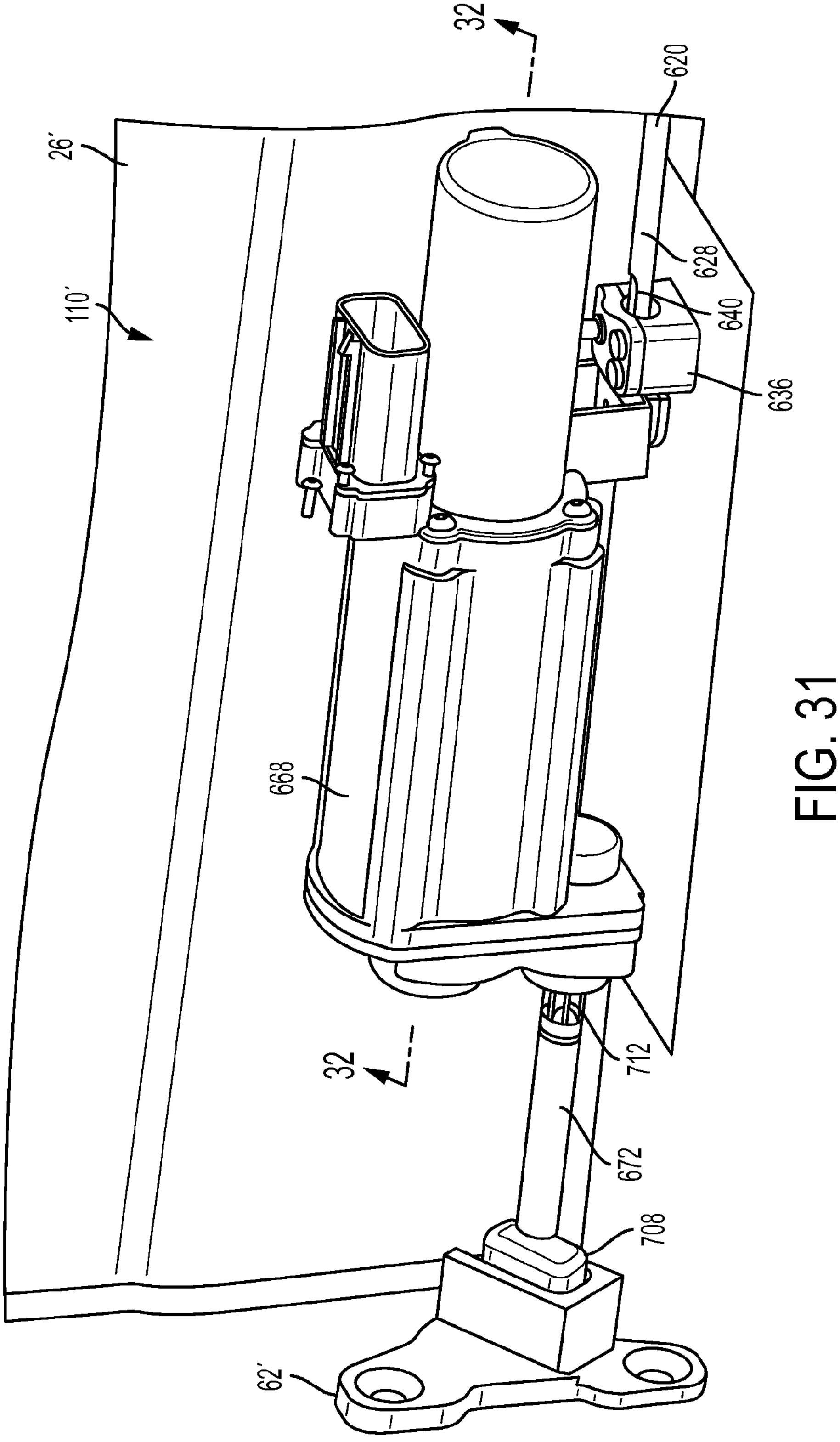
FIG. 31 is a detailed view of the motor housing of the power closure system of FIG. 29.

With reference to FIGS. 29-31, the powered closure system 614 includes a torque bar system 618 configured to act as a counterbalance for the weight of the tailgate 26' as it moves between the open and closed positions. The torque bar system 616 includes a torque bar 620 having a first end 624 and a second end 628 opposite the first end 624, a coupler 632 fixedly coupled to the first end 624 of the torque bar 620, and an anchor block 636 fixedly coupled to the second end 628 of the torque bar 620. During use, rotational motion of the tailgate 26' with respect to the cargo bed 10' is transmitted to the torque bar 620' which, through torsion, creates a torque acting about the axis of rotation 182' opposite the moment created about the axis 182' by the weight of the tailgate 26'.

The torque bar 620 of the torque bar system 618 includes a substantially elongated metallic bar having a first end 624 and a second end 628 opposite the first end 624. As described above, the torque bar 620 produces torque by way of torsion when the first end 624 of the bar is rotated with respect to the second end 628 of the bar. In the illustrated embodiment, both the first end 624 and the second end 628 of the torque bar 620 include a key surface 640. When assembled, the keyed surfaces 640 are configured to engage with and rotationally lock the first end 624 and the second end 628 of the torque bar with the coupler 632 and the anchor block 636, respectively.

With reference to FIGS. 29 and 30, the coupler 632 of the torque bar system 616 is rotatably positioned within the hinge member 150' of the first corner bracket 138' of the tailgate 26' and is configured to rotationally fix the first end 624 of the torque bar 620 with respect to the cargo bed 10' via the first hinge bracket 46'. The coupler 632 is substantially cylindrical in shape having a first portion 644 defining a first outer diameter and a second portion 648 extending axially from the first portion 644 to define a second outer diameter smaller than the first outer diameter. More specifically, the first outer diameter is configured to substantially correspond to the inner diameter of the first open end 154' of the hinge member 150' and the second outer diameter is configured to substantially correspond to the inner diameter of the second open end 162' of the hinge member 150'. The size and shape of the coupler 632 allows the coupler 632 to rotate with respect to the hinge member 150' while providing the necessary support for the tailgate 26' within the closure frame 22' of the cargo bed 10'.

The first portion 644 of the coupler 632 is disposed outside the first corner bracket 138' and configured to engage the first hinge bracket 46' of the cargo bed 10'. In the illustrated construction, the first portion 644 of the coupler 632 defines a recess 652 shaped such that the first hinge bracket 46' may be axially inserted therein. Once inserted, the corresponding shapes of the recess 652 and bracket 46' cause the first hinge bracket 46' and the coupler 632 to be rotationally fixed.

Best illustrated in FIG. 30, the second portion 648 of the coupler 632 defines a smaller diameter than the first portion 644 and includes a keyed recess 656. In the illustrated construction, the keyed recess 656 includes a flat, planar surface within an otherwise cylindrical opening into which the first end 624 of the torque bar 620 may be inserted. Once assembled, the coupler 632 and the first end 624 of the torque bar 620 rotate together as a unit.

Illustrated in FIGS. 29 and 31, the anchor block 660 of the torque bar system 618 is fixedly coupled to both the second corner bracket 166' of the tailgate 26' and the second end 628 of the torque bar 620. During use, the anchor block 660 is configured to fix the second end 628 of the torque bar 620 with respect to the tailgate 10', causing the two elements to rotate together as a unit.

Figure 32:
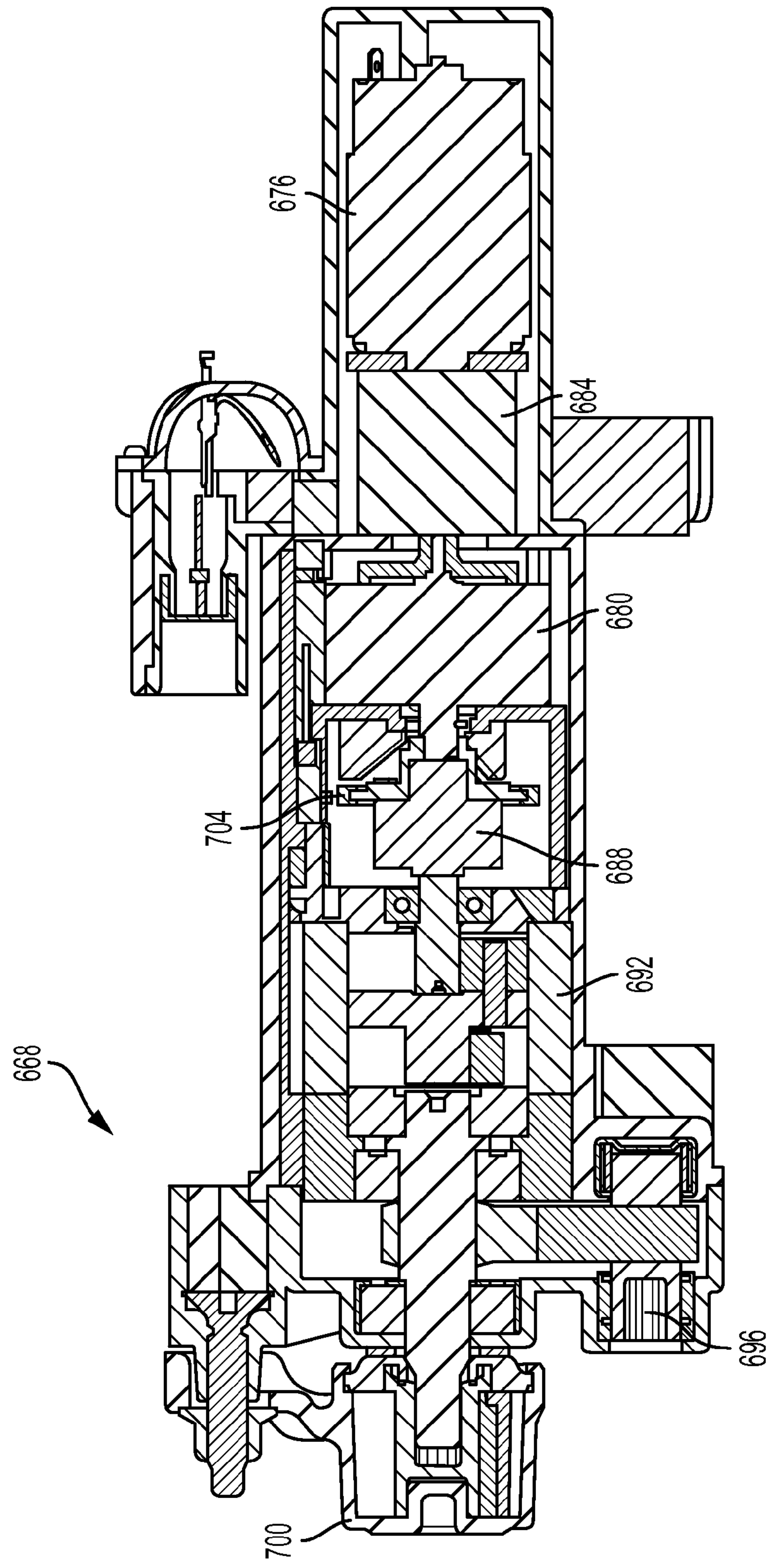
FIG. 32 is a section view taken along line 32-32 of FIG. 31.

Illustrated in FIGS. 29, 31, and 32, the motor assembly of the powered closure system 664 includes a motor housing 668 positioned within the volume 110' of the tailgate 26' and a drive shaft 672 extending between the motor housing 668 and the second hinge bracket 62' to transmit torque therebetween. The motor housing 668 includes a motor 676, a first clutch 680, a first gear set 684 positioned between the motor 676 and the first clutch 680, a second clutch 688, a second gear set 692 driven by the second clutch 688, and an output shaft 696 driven by the second gear set 692. During operation, the output shaft 696 is rotatable in a first direction, causing the tailgate 26' to rotate, via the drive shaft 672, generally toward the opened position. In contrast, the output shaft 696 is also rotatable in a second direction, opposite the first direction, causing the tailgate 26' to rotate, via the drive shaft 672, generally toward the closed position. As described above, the motor 676 is in electrical communication with an ECM (not shown) which provides the electrical signals necessary to drive the motor 676 for the duration and direction desired.

Illustrated in FIG. 32, the first clutch 680 of the motor housing 668 includes an electromagnetic clutch and is configured to selectively transmit torque between the motor 676 and the output shaft 696 via the second clutch 688. In particular, the first clutch 680 is operable in an engaged configuration, where torque is transmitted through the first clutch 680, and a disengaged configuration, where torque is not transmitted through the first clutch 680. During use, the first clutch 680 defaults to the disengaged configuration, isolating the motor 676 from the remainder of the drive train and permitting the user to manually open and close the tailgate 26' without the added forces involved in backdriving the motor 676 and first gear set 684.

Similar to the motor 676, the first clutch 680 is in electrical communication with an ECM which in turn provides the necessary signals to determine when the first clutch 680 is in the engaged and disengaged configurations. As discussed previously, the engaged and disengaged configurations of the first clutch 680 corresponds to the manual and automatic modes of operation—which operate the same as described above.

The second clutch 688 of the motor housing 668 includes an abusive slip device positioned between the first clutch 680 and the output shaft 696. During use, the second clutch 688 is configured to disengage when an abusive or excessively large force propagates through the motor assembly. The second clutch 688 operates separately from the first clutch 680, being configured to release based on the forces within the system (i.e., at a set torque amount) rather than the mode of operation. In the illustrated construction, the second clutch 688 is set to a torque load release point slightly above the maximum torque needed to open and close the tailgate during normal operation.

The motor housing 668 also includes a rotary hydraulic damper 700 that is operably to the output shaft 696. During use, the rotary hydraulic damper 700 applies dampening forces to the output shaft 696 to help regulate the movement of the tailgate 26' with respect to the cargo bed 10'. In some constructions, the damper 700 may be used in lieu of an external damper (described above). In other embodiments, the damper 700 may be combination with an external damper. In the illustrated construction, the damper 700 is operatively coupled to the output shaft 696 such that regardless of whether the first or second clutches 680, 688 disengage, the fluid damper 700 will always be able to provide a dampening effect to the motion of the tailgate 26'. This is particularly useful in loss of power or manual opening situations.

In the illustrated construction, the fluid damper 700 provides a dampening force over the entire travel arc of the tailgate 26' (i.e., from open to close). However, in alternative embodiments, the fluid damper 700 may be configured such that it only provides a dampening force over a portion of the overall travel arc of the liftgate 26'. For example, in some embodiments, the damper 700 may only provide dampening forces over the final 5 to 15 degrees of travel before the tailgate 26' reaches the end of it's travel arc. In another embodiment, the damper 700 may only provide dampening forces over the final 15 to 20 degrees of travel. In such embodiments, the damper 700 may provide reduced or no dampening forces over the remainder of the travel arc. In still other embodiments, the damper 700 may provide dampening forces at one or both extents of travel (i.e., near full open and/or near full close). In still other embodiments, the damper 700 may only provide dampening forces when the tailgate 26 is traveling in a particular direction (i.e., when the tailgate 26 is being opened, but not when being closed).

The motor housing 668 also includes position sensor 704 to record the position of the tailgate 26 with respect to the closure frame 22.

The powered closure system also includes a drive shaft 672 operatively coupling the motor housing 668 and the second hinge bracket 62' to transmit torque therebetween. In the illustrated construction, the drive shaft 672 extends through the second corner bracket 166' and includes a first end 708, positioned outside the volume 110' of the tailgate 26', and a second end 712 positioned inside the volume 110' of the tailgate 26'.

In the illustrated construction, the first end 708 of the drive shaft 672 forms a lug that is sized and shaped to be at least partially received within the second hinge bracket 62' of the cargo bed 10'. The first end 708 is substantially rectangular in shape such that the drive shaft 672 is rotationally fixed with respect to the second hinge bracket 62' and the cargo bed 10'. During use, the first end 708 of the drive shaft 672 may be radially inserted into and removed from the second hinge bracket 62'.

With reference to FIG. 31, the second end 712 of the drive shaft 672 includes a plurality of splines 716 sized to couple with the output shaft 696 of the motor housing 668. In particular, the second end 712 is shaped such that it transmits torque and rotates together with the output shaft 696 of the motor housing 668.

While exemplary embodiments have been described and shown, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiments disclosed as the best mode contemplated for carrying out this invention.

The invention claimed is:

1. A tailgate drive for use with a tailgate in a cargo bed of a pickup truck, the cargo bed having a first hinge bracket and a second hinge bracket, and the tailgate defining a volume therein, the tailgate drive comprising:

a counterbalance assembly positioned within the volume of the tailgate and removably coupled to one of the first hinge bracket and the second hinge bracket;

a motor assembly positioned within the volume of the tailgate and removably coupled to one of the first hinge bracket and the second hinge bracket, the motor assembly operable to rotate the tailgate with respect to the cargo bed between an opened position and a closed position;

wherein the motor assembly includes a motor, a first clutch, and an output shaft operatively coupled to one of the first hinge bracket and the second hinge bracket, and wherein the first clutch is adjustable between an engaged configuration, where the first clutch transmits torque between the motor and the output shaft, and a disengaged configuration, where the first clutch does not transmit torque between the motor and the output shaft; and wherein the tailgate drive further comprises a second clutch in operable communication with both the first clutch and the output shaft, wherein the second clutch is an abusive overload clutch, and wherein the second clutch operates independently of the first clutch.

2. The tailgate drive of claim 1, wherein the counterbalance assembly includes a torque bar, wherein the torque bar includes a first end coupled to and rotationally fixed with respect to the tailgate, and a second end, opposite the first end, removably coupled to and rotationally fixed with respect to one of the first hinge bracket and the second hinge bracket.

3. The tailgate drive of claim 1, wherein the motor assembly is operable in a manual mode, wherein a user moves the tailgate between an open and closed position, and an automatic mode, where the motor assembly moves the tailgate between an open and closed position.

4. The tailgate drive of claim 1, further comprising a damper operatively coupled to the output shaft, and wherein the damper provides dampening forces to limit the movement of the tailgate with respect to the cargo bed.

5. The tailgate drive of claim 1, wherein the clutch adjusts from the engaged configuration to the disengaged configuration based at least in part on the level of torque applied to the clutch.

6. The tailgate drive of claim 1, wherein the clutch adjusts between the engaged configuration and the disengaged configuration upon receiving signals from an electronic control module.

7. The tailgate drive of claim 1, further comprising a damper operatively coupled to the output shaft, and wherein the fluid damper provides dampening forces to limit the motion of the tailgate with respect to the cargo bed regardless of the configuration of the first clutch and the second clutch.

8. The tailgate drive of claim 1, wherein the first clutch is adjustable between the engaged configuration and the disengaged configuration upon receiving signals from an electronic control module.

9. A tailgate drive for use with a tailgate positioned in a cargo bed of a motor vehicle, the cargo bed having a first hinge bracket and a second hinge bracket coupled thereto, and the tailgate is rotatable about an axis with respect to the cargo bed between an open position and a closed position, where the axis is at least partially defined by the first hinge bracket and the second hinge bracket, and the tailgate defines a volume therein, the tailgate drive comprising:

- a motor assembly positioned within the volume of the tailgate, the motor assembly having a motor with an output shaft;
- a first link coupled to and rotatable with the output shaft, the first link having a first distal end;
- a second link coupled to and rotatable with the first hinge bracket, the second link having a second distal end;
- a connecting link extending between and rotatably coupled to the first distal end of the first link and the second distal end of the second link; and
- wherein the motor assembly is operable to rotate the tailgate about the axis between the opened position and the closed position.

10. The tailgate drive of claim 9, wherein the motor assembly further includes a clutch, and wherein the clutch is adjustable between an engaged configuration, where the clutch transmits torque between the motor and the one of the first hinge bracket and the second hinge bracket, and a disengaged configuration, where the clutch does not transmit torque between the motor and the one of the first hinge bracket and the second hinge bracket.

11. The tailgate drive of claim 10, where the clutch is a first clutch, and the tailgate drive further comprises a second clutch in operable communication with both the first clutch and the one of the first hinge bracket and the second hinge bracket, and wherein the second clutch operates independently of the first clutch.

12. The tailgate drive of claim 11, wherein the second clutch is an abusive overload clutch.

13. A tailgate drive for use with a tailgate positioned in a cargo bed of a motor vehicle, the cargo bed having a first hinge bracket and a second hinge bracket coupled thereto, the tailgate defining a volume therein and being rotatable with respect to the cargo bed between an opened position and a closed position, the tailgate drive comprising:

- a motor assembly having an output shaft with a driving member fixedly coupled thereto;
- a first toothed gear pivotably coupled to the driving member;
- a pawl pivotable with respect to the first toothed gear and adjustable between an engaged position, where the driving member rotates together with the first toothed gear in both a first direction of rotation and a second direction of rotation, and a disengaged position, where the driving member rotates independent from the first toothed gear in a first direction; and
- a second toothed gear engaging the first tooth gear and coupled to one of the first hinge bracket and the second hinge bracket.

14. The tailgate drive of claim 13, wherein the motor assembly further includes a motor.

15. The tailgate of claim 14, wherein the motor assembly further includes a damper operably coupled to the output shaft, and wherein the damper provides dampening forces to limit the motion of the tailgate with respect to the cargo bed.

16. The tailgate assembly of claim 13, wherein the motor assembly further includes a position sensor positioned operatively coupled to the output shaft.

* * * * *